United States Patent
Rahn et al.

(10) Patent No.: US 11,075,694 B2
(45) Date of Patent: Jul. 27, 2021

(54) FREQUENCY DIVISION MULTIPLE ACCESS OPTICAL SUBCARRIERS

(71) Applicant: Infinera Corporation, Sunnyvale, CA (US)

(72) Inventors: Jeffrey T. Rahn, Sunnyvale, CA (US); Kuang-Tsan Wu, Kanata (CA); Steven J. Hand, Los Gatos, CA (US); David F. Welch, Atherton, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/578,393

(22) Filed: Sep. 22, 2019

(65) Prior Publication Data

US 2020/0403704 A1    Dec. 24, 2020

Related U.S. Application Data

(60) Provisional application No. 62/813,151, filed on Mar. 4, 2019.

(51) Int. Cl.
*H04B 7/26* (2006.01)
*H04B 10/50* (2013.01)
(Continued)

(52) U.S. Cl.
CPC ....... *H04B 7/2656* (2013.01); *H04B 10/0773* (2013.01); *H04B 10/0793* (2013.01);
(Continued)

(58) Field of Classification Search
CPC .... H04B 10/505; H04B 10/61; H04B 10/532; H04B 10/2575; H04B 10/516;
(Continued)

(56) References Cited

U.S. PATENT DOCUMENTS

| 4,483,000 A | 11/1984 | Yamamoto et al. |
| 4,528,565 A | 7/1985 | Hauptmann |

(Continued)

FOREIGN PATENT DOCUMENTS

| EP | 0512642 | 11/1992 |
| EP | 3208957 | 8/2017 |

(Continued)

OTHER PUBLICATIONS

J. Leuthold et al., "Super Channels Based on Nyquist Multiplexing," 2012 17th Opto-Electronics and Communications Conference (OECC 2012) Technical Digest, Jul. 2012, Busan, Kor.

(Continued)

*Primary Examiner* — Abbas H Alagheband
(74) *Attorney, Agent, or Firm* — David L. Soltz

(57) ABSTRACT

A network or system in which a hub or primary node may communicate with a plurality of leaf or secondary nodes. The hub node may operate or have a capacity greater than that of the leaf nodes. Accordingly, relatively inexpensive leaf nodes may be deployed to receive data carrying optical signals from, and supply data carrying optical signals to, the hub node. One or more connections may couple each leaf node to the hub node, whereby each connection may include one or more spans or segments of optical fibers, optical amplifiers, optical splitters/combiners, and optical add/drop multiplexer, for example. Optical subcarriers may be transmitted over such connections, each carrying a data stream. The subcarriers may be generated by a combination of a laser and a modulator, such that multiple lasers and modulators are not required, and costs may be reduced. As the bandwidth or capacity requirements of the leaf nodes change, the number of subcarriers, and thus the amount of data provided to each node, may be changed accordingly. Each subcarrier within a dedicated group of subcarriers may (Continued)

carry OAM or control channel information to a corresponding leaf node, and such information may be used by the leaf node to configure the leaf node to have a desired bandwidth or capacity.

13 Claims, 33 Drawing Sheets

(51) Int. Cl.
| | |
|---|---|
| H04B 10/548 | (2013.01) |
| H04B 10/61 | (2013.01) |
| H04B 10/69 | (2013.01) |
| H04J 14/02 | (2006.01) |
| H04L 1/00 | (2006.01) |
| H04L 5/00 | (2006.01) |
| H04J 14/08 | (2006.01) |
| H04J 14/00 | (2006.01) |
| H04B 10/077 | (2013.01) |
| H04B 10/079 | (2013.01) |
| H04B 10/25 | (2013.01) |
| H04B 10/40 | (2013.01) |
| H04J 99/00 | (2009.01) |
| H04Q 11/00 | (2006.01) |
| H04B 10/2575 | (2013.01) |

(52) U.S. Cl.
CPC ....... *H04B 10/25* (2013.01); *H04B 10/25754* (2013.01); *H04B 10/40* (2013.01); *H04B 10/503* (2013.01); *H04B 10/504* (2013.01); *H04B 10/505* (2013.01); *H04B 10/548* (2013.01); *H04B 10/61* (2013.01); *H04B 10/613* (2013.01); *H04B 10/69* (2013.01); *H04J 14/005* (2013.01); *H04J 14/0298* (2013.01); *H04J 14/08* (2013.01); *H04J 15/00* (2013.01); *H04L 1/0041* (2013.01); *H04L 1/0045* (2013.01); *H04L 1/0071* (2013.01); *H04L 5/001* (2013.01); *H04Q 11/0005* (2013.01); *H04Q 11/0067* (2013.01); *H04Q 2011/0015* (2013.01); *H04Q 2011/0035* (2013.01); *H04Q 2011/0079* (2013.01)

(58) Field of Classification Search
CPC ....... H04Q 11/0005; H04Q 2011/0035; H04Q 2011/0015; H04J 15/00
USPC .......................................................... 398/45
See application file for complete search history.

(56) References Cited

U.S. PATENT DOCUMENTS

| | | | |
|---|---|---|---|
| 5,153,762 A | 10/1992 | Huber | |
| 5,208,692 A | 5/1993 | McMahon | |
| 5,596,436 A | 1/1997 | Sargis | |
| 5,822,094 A | 10/1998 | O'Sullivan | |
| 5,825,857 A | 10/1998 | Reto | |
| 6,046,838 A | 4/2000 | Kou | |
| 6,362,913 B2 | 3/2002 | Ooi et al. | |
| 6,525,857 B1 | 2/2003 | Way | |
| 6,563,880 B1 | 5/2003 | Hunsinger et al. | |
| 6,580,544 B1 | 6/2003 | Lin et al. | |
| 6,687,044 B2 | 2/2004 | Paquet | |
| 7,266,306 B1 | 9/2007 | Harley et al. | |
| 7,466,919 B1 | 2/2008 | Birk et al. | |
| 7,346,284 B2 | 3/2008 | Wan | |
| 7,376,358 B2 | 5/2008 | Roberts et al. | |
| 7,447,436 B2 | 11/2008 | Yee | |
| 7,596,323 B1 * | 9/2009 | Price | H04B 10/0775 398/140 |
| 7,701,842 B2 | 4/2010 | Roberts et al. | |
| 7,715,710 B2 | 5/2010 | Wan | |
| 7,729,621 B2 | 6/2010 | Nahapetian et al. | |
| 7,756,421 B2 | 7/2010 | Roberts | |
| 7,826,752 B1 | 11/2010 | Zanoni | |
| 8,184,992 B2 | 5/2012 | Kikuchi | |
| 8,203,777 B2 | 6/2012 | Smith et al. | |
| 8,412,047 B2 | 4/2013 | Tanaka | |
| 8,437,645 B2 | 5/2013 | Boffi et al. | |
| 8,472,810 B2 | 6/2013 | Akiyama | |
| 8,477,056 B2 | 7/2013 | Sun et al. | |
| 8,477,656 B2 | 7/2013 | O'Mahony | |
| 8,478,137 B2 | 7/2013 | Komaki et al. | |
| 8,655,190 B2 | 2/2014 | Wu et al. | |
| 8,682,180 B1 | 3/2014 | Nimon et al. | |
| 8,730,079 B2 | 5/2014 | Tudose | |
| 8,768,177 B2 | 7/2014 | Wu et al. | |
| 8,861,977 B2 | 10/2014 | McNicol | |
| 8,929,750 B2 | 1/2015 | Ishihara | |
| 8,965,203 B1 | 2/2015 | Vahdat | |
| 8,971,723 B2 | 3/2015 | Le Taillandier De Gabory | |
| 8,989,593 B2 | 3/2015 | Sun et al. | |
| 9,020,363 B2 | 4/2015 | Yasuda | |
| 9,048,957 B2 | 6/2015 | Nakashima | |
| 9,112,609 B2 | 8/2015 | Kim et al. | |
| 9,154,231 B2 | 10/2015 | Kaneda | |
| 9,166,692 B1 | 10/2015 | Felderman | |
| 9,197,320 B2 | 11/2015 | Vassilieva | |
| 9,244,928 B1 | 1/2016 | Nishimoto | |
| 9,270,379 B2 | 2/2016 | Huang et al. | |
| 9,281,915 B2 | 3/2016 | Kaneda | |
| 9,363,585 B2 | 6/2016 | Carpini | |
| 9,419,720 B2 | 8/2016 | Akiyama | |
| 9,461,749 B2 | 10/2016 | Jansen et al. | |
| 9,485,554 B1 | 11/2016 | Kim | |
| 9,553,675 B2 | 1/2017 | Karar et al. | |
| 9,608,866 B2 | 3/2017 | Nagarajan | |
| 9,673,907 B1 | 6/2017 | Vassilieva | |
| 9,686,020 B2 | 6/2017 | Mochizuki et al. | |
| 9,705,592 B1 | 7/2017 | Schmogrow | |
| 9,735,881 B1 | 8/2017 | Agazzi et al. | |
| 9,991,953 B1 | 6/2018 | Fludger | |
| 10,014,975 B2 | 7/2018 | Krause et al. | |
| 10,027,424 B2 | 7/2018 | Zhuge et al. | |
| 10,243,653 B2 | 3/2019 | Wiswell | |
| 10,243,688 B2 | 3/2019 | Vassilieva | |
| 10,348,410 B1 | 7/2019 | Charlton | |
| 10,374,623 B1 | 8/2019 | Oveis Gharan | |
| 10,374,721 B2 | 8/2019 | Awdalla | |
| 10,389,447 B1 | 8/2019 | Khandani | |
| 10,397,190 B2 | 8/2019 | Akhavain Mohammadi | |
| 10,491,302 B1 | 11/2019 | Morris | |
| 10,523,315 B2 | 12/2019 | Jiang | |
| 10,547,388 B2 | 1/2020 | Ikeda | |
| 10,574,362 B2 | 2/2020 | Chen | |
| 10,587,358 B1 * | 3/2020 | Ebrahimzad | H04B 10/516 |
| 2002/0003641 A1 | 1/2002 | Hall | |
| 2002/0005971 A1 | 1/2002 | Sasai | |
| 2002/0034194 A1 | 3/2002 | Shattil | |
| 2002/0067883 A1 | 6/2002 | Lo | |
| 2002/0114038 A1 | 8/2002 | Arnon | |
| 2002/0122518 A1 | 9/2002 | Yasuda et al. | |
| 2002/0145783 A1 | 10/2002 | Chang | |
| 2003/0020995 A1 | 1/2003 | Harasawa | |
| 2003/0223751 A1 | 12/2003 | Shimizu | |
| 2004/0016874 A1 | 1/2004 | Rao | |
| 2004/0019459 A1 | 1/2004 | Dietz | |
| 2004/0032643 A1 | 2/2004 | Chimfwembe | |
| 2004/0033074 A1 | 2/2004 | Hsu | |
| 2004/0105682 A1 | 6/2004 | Roberts | |
| 2004/0197103 A1 | 7/2004 | Roberts | |
| 2004/0151109 A1 | 8/2004 | Batra | |
| 2004/0198265 A1 | 10/2004 | Wallace | |
| 2004/0208614 A1 | 10/2004 | Price | |
| 2004/0252996 A1 | 12/2004 | McNicol | |
| 2005/0008085 A1 | 1/2005 | Lee | |
| 2005/0074037 A1 | 4/2005 | Rickard | |
| 2005/0111789 A1 | 5/2005 | Hayes | |
| 2005/0147415 A1 | 7/2005 | Fee | |
| 2005/0169585 A1 | 8/2005 | Aronson | |

(56) References Cited

U.S. PATENT DOCUMENTS

| | | |
|---|---|---|
| 2005/0175112 A1 | 8/2005 | Pisani |
| 2005/0175339 A1 | 8/2005 | Herskowits |
| 2006/0078336 A1 | 4/2006 | McNicol et al. |
| 2006/0093052 A1 | 5/2006 | Cho |
| 2006/0159454 A1 | 7/2006 | Bjornstad |
| 2006/0215540 A1 | 9/2006 | Krishnamoorthi |
| 2006/0233147 A1 | 10/2006 | Karabinis |
| 2006/0269295 A1 | 11/2006 | Way |
| 2006/0280510 A1 | 12/2006 | Onaka |
| 2007/0004465 A1 | 1/2007 | Papasakellariou |
| 2007/0025421 A1 | 2/2007 | Shattil |
| 2007/0092263 A1 | 4/2007 | Agazzi |
| 2008/0063409 A1 | 3/2008 | Toliver |
| 2008/0085125 A1 | 4/2008 | Frankel |
| 2008/0232816 A1 | 9/2008 | Hoshida |
| 2008/0267630 A1 | 10/2008 | Qian |
| 2009/0110033 A1 | 4/2009 | Shattil |
| 2009/0154336 A1 | 6/2009 | Green |
| 2009/0190929 A1 | 7/2009 | Khurgin |
| 2009/0196603 A1 | 8/2009 | Zhou |
| 2009/0214224 A1 | 8/2009 | Cho |
| 2009/0232234 A1 | 9/2009 | Du |
| 2009/0238578 A1 | 9/2009 | Taylor |
| 2009/0238580 A1 | 9/2009 | Kikuchi |
| 2009/0257344 A1 | 10/2009 | Huang |
| 2009/0257755 A1 | 10/2009 | Buelow |
| 2009/0092389 A1 | 11/2009 | Wei |
| 2010/0021163 A1 | 1/2010 | Shieh |
| 2010/0021166 A1 | 1/2010 | Way |
| 2010/0028002 A1 | 2/2010 | Qian |
| 2010/0086303 A1 | 4/2010 | Qian |
| 2010/0142964 A1 | 6/2010 | Chang et al. |
| 2010/0142967 A1 | 6/2010 | Perez |
| 2010/0178057 A1 | 7/2010 | Shieh |
| 2010/0189445 A1 | 7/2010 | Nakashima |
| 2010/0215368 A1 | 8/2010 | Qian |
| 2010/0246581 A1 | 9/2010 | Henry |
| 2010/0254707 A1 | 10/2010 | Peng |
| 2010/0329671 A1 | 12/2010 | Essiambre |
| 2010/0329683 A1 | 12/2010 | Liu |
| 2011/0097092 A1 | 4/2011 | Wagner et al. |
| 2011/0135301 A1 | 6/2011 | Myslinski |
| 2011/0142450 A1 | 6/2011 | Tanzi et al. |
| 2011/0150475 A1 | 6/2011 | Soto et al. |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1 | 10/2011 | Grigoryan |
| 2012/0002703 A1 | 1/2012 | Yamashita |
| 2012/0033965 A1 | 2/2012 | Zhang |
| 2012/0045209 A1 | 2/2012 | Boyd |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1 | 6/2012 | Nakashima |
| 2012/0141135 A1 | 6/2012 | Yang |
| 2012/0148264 A1* | 6/2012 | Liu .............. H04L 27/2697 398/202 |
| 2012/0219285 A1 | 8/2012 | Dahan |
| 2012/0251119 A1 | 10/2012 | McNicol |
| 2012/0251121 A1 | 10/2012 | McNicol |
| 2012/0263471 A1 | 10/2012 | Buchali |
| 2012/0269510 A1 | 10/2012 | Hui |
| 2012/0269515 A1 | 10/2012 | Cvijetic |
| 2013/0070785 A1* | 3/2013 | Liu ................. C02F 1/78 370/464 |
| 2013/0070786 A1 | 3/2013 | Liu |
| 2013/0101296 A1 | 4/2013 | Nishimoto |
| 2013/0108271 A1 | 5/2013 | Tang et al. |
| 2013/0136449 A1 | 5/2013 | Liu |
| 2013/0170834 A1 | 7/2013 | Cho et al. |
| 2013/0191877 A1 | 7/2013 | Rakib |
| 2013/0195452 A1* | 8/2013 | Hui ............... H04Q 11/0005 398/50 |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1 | 3/2014 | Kim |
| 2014/0079391 A1 | 3/2014 | Kim |
| 2014/0092924 A1 | 4/2014 | Krause et al. |
| 2014/0099116 A1* | 4/2014 | Bai ............... H04B 10/6161 398/76 |
| 2014/0126916 A1 | 5/2014 | Ota |
| 2014/0153925 A1 | 6/2014 | Nishihara et al. |
| 2014/0205286 A1 | 7/2014 | Ji et al. |
| 2014/0233963 A1 | 8/2014 | Le Taillandier De Gabory |
| 2014/0241727 A1 | 8/2014 | Lim et al. |
| 2014/0270759 A1 | 9/2014 | Djordjevic |
| 2014/0270761 A1 | 9/2014 | Xu |
| 2014/0270803 A1 | 9/2014 | Olsson |
| 2014/0294381 A1 | 10/2014 | McNicol |
| 2014/0314411 A1 | 10/2014 | Huang |
| 2014/0314416 A1 | 10/2014 | Vassilieva |
| 2014/0341587 A1 | 11/2014 | Nakashima |
| 2014/0363164 A1 | 12/2014 | Kim |
| 2014/0376930 A1 | 12/2014 | Shiba |
| 2015/0063808 A1 | 3/2015 | Xia |
| 2015/0071642 A1 | 3/2015 | Tanaka |
| 2015/0093118 A1 | 4/2015 | Jia |
| 2015/0098700 A1 | 4/2015 | Zhu |
| 2015/0117860 A1 | 4/2015 | Braun |
| 2015/0125160 A1 | 5/2015 | Wen |
| 2015/0188637 A1 | 7/2015 | Tanimura |
| 2015/0188642 A1 | 7/2015 | Sun |
| 2015/0229332 A1 | 8/2015 | Yuan |
| 2015/0229401 A1 | 8/2015 | Tanaka |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0333860 A1 | 11/2015 | Rahn |
| 2016/0013881 A1 | 1/2016 | Rejaly et al. |
| 2016/0029403 A1 | 1/2016 | Roy et al. |
| 2016/0050021 A1 | 2/2016 | Hua |
| 2016/0057516 A1 | 2/2016 | Hochberg |
| 2016/0094292 A1 | 3/2016 | Mochizuki |
| 2016/0099777 A1 | 4/2016 | Liu |
| 2016/0112141 A1 | 4/2016 | Rahn |
| 2016/0142150 A1 | 5/2016 | Lyubomirsky |
| 2016/0191168 A1 | 6/2016 | Huang |
| 2016/0192042 A1 | 6/2016 | Mitchell |
| 2016/0197681 A1 | 7/2016 | Sun |
| 2016/0218812 A1 | 7/2016 | Okabe |
| 2016/0233963 A1* | 8/2016 | Zhuge ............ H04B 10/2543 |
| 2016/0261347 A1 | 9/2016 | Karar |
| 2016/0277816 A1 | 9/2016 | Yuang |
| 2016/0316281 A1 | 10/2016 | Keyworth |
| 2016/0323039 A1 | 11/2016 | Sun et al. |
| 2017/0005747 A1 | 1/2017 | Kim |
| 2017/0019168 A1 | 1/2017 | Menard |
| 2017/0033864 A1 | 2/2017 | Nagarajan |
| 2017/0033999 A1 | 2/2017 | Nagarajan |
| 2017/0041691 A1 | 2/2017 | Rickman |
| 2017/0054513 A1 | 2/2017 | Guo |
| 2017/0070313 A1 | 3/2017 | Kato |
| 2017/0078028 A1 | 3/2017 | Zhang |
| 2017/0078044 A1 | 3/2017 | Hino |
| 2017/0104535 A1 | 4/2017 | Hoshida |
| 2017/0134836 A1 | 5/2017 | Sindhy |
| 2017/0149507 A1 | 5/2017 | Le Taillandier De Gabory |
| 2017/0163347 A1 | 6/2017 | Akiyama |
| 2017/0222716 A1 | 8/2017 | Nakashima |
| 2017/0237500 A1 | 8/2017 | Nishimoto |
| 2017/0250775 A1 | 8/2017 | Kato |
| 2017/0324480 A1 | 11/2017 | Elmirghani |
| 2017/0366267 A1 | 12/2017 | Campos |
| 2017/0367061 A1* | 12/2017 | Kim ............... H04W 56/005 |
| 2018/0034555 A1* | 2/2018 | Goh ............... G02B 6/122 |
| 2018/0115407 A1 | 4/2018 | Melikyan |
| 2018/0120520 A1 | 5/2018 | Kelly |
| 2018/0145761 A1 | 5/2018 | Zhuge |

(56) References Cited

U.S. PATENT DOCUMENTS

| | | |
|---|---|---|
| 2018/0198547 A1 | 7/2018 | Mehrvar |
| 2018/0219632 A1 | 8/2018 | Yoshida |
| 2018/0234285 A1 | 8/2018 | Djordjevic |
| 2018/0241476 A1 | 8/2018 | Johnson |
| 2018/0278331 A1 | 9/2018 | Cao |
| 2018/0324717 A1 | 11/2018 | Zhou |
| 2018/0359047 A1 | 12/2018 | Vassilieva |
| 2019/0020409 A1 | 1/2019 | Le Taillandier De Gabory |
| 2019/0097728 A1 | 3/2019 | Frankel |
| 2019/0123819 A1 | 4/2019 | Jiang |
| 2019/0149242 A1 | 5/2019 | Torbatian |
| 2019/0149389 A1 | 5/2019 | Torbatian |
| 2019/0253153 A1 | 8/2019 | Sun |
| 2019/0260493 A1 | 8/2019 | Chimfwembe |
| 2019/0288777 A1 | 9/2019 | Ishimura |
| 2019/0312640 A1 | 10/2019 | Binkai |
| 2020/0076508 A1 | 3/2020 | Jia |
| 2020/0177525 A1 | 6/2020 | Morris |

FOREIGN PATENT DOCUMENTS

| | | |
|---|---|---|
| WO | WO 2012100714 | 8/2012 |
| WO | WO 2014114332 | 7/2014 |

OTHER PUBLICATIONS

S. Watanabe et al., "Optical Coherent Broad-Band Transmission for Long-Haul and Distribution Systems Using Subcarrier Multiplexing," Journal of Lightwave Technology, vol. 11, No. 1, Jan. 1993, pp. 116-127.

M. Jinno et al., "Demonstration of Novel Spectrum-Efficient Elastic Optical Path Network with Per-Channel Variable Capacity of 40 Gb/s to Over 400 Gb/s," ECOC 2008, Sep. 21-25, 2008, Brussels, Belgium, Th.3.F.6.

Y. Chen Et Al., "Experimental Demonstration of Roadm Functionality on an Optical Scfdm Superchannel," IEEE Photonics Technology Letters, vol. 24, No. 3, Feb. 1, 2012, pp. 215-217.

Adaptive Software Defined Terabit Transceiver for Flexible Optical Networks, Public executive summary of the Final Project Periodic Report, Jun. 16, 2016.

Hillerkus, Single-Laser Multi-Terabit/s Systems, KIT Scientific Publishing, 2013, Chapters 1, 3, and 6.

Hu et al., "Flexible and Concurrent All-Optical VPN in OFDMA PON," IEEE Photonics Technology Journal, vol. 5, No. 6, Dec. 2013.

Bosco et al., "On the Performance of Nyquist-WDM Terabit Superchannels Based on PM-BPSK, PM-QPSK, PM-8QAM or PM-16QAM Subcarries," Journal Of Lightwave Technology, vol. 29, No. 1, Jan. 1, 2011, pp. 53-60.

K. Roberts et al., "Flexible Transceivers," ECOC Technical Digest, 2012, We.3.A.3.

K. Roberts et al., "High Capacity Transport—100G and Beyond," Journal of Lightwave Technology, vol. 33, No. 3, Feb. 1, 2015, pp. 563-578.

J. Reis et al., "Performance Optimization of Nyquist Signaling for Spectrally Efficient Optical Access Networks [Invited]," J. Opt. Commun. Netw./vol. 7, No. 2, Feb. 2015, pp. A200-A208.

R. Ferreira et al, Coherent Nyquist UDWDM-PON With Digital Signal Processing in Real Time, Journal of Lightwave Technology, vol. 34, No. 2, Jan. 15, 2016, pp. 826-833.

A. Shahpari et al., "Coherent Access: A Review", Journal Of Lightwave Technology, vol. 35, No. 4, Feb. 15, 2017, pp. 1050-1058.

P. Layec et al., "Rate-Adaptable Optical Transmission and Elastic Optical Networks," Chapter 15, Enabling Technologies for High Spectral-efficiency Coherent Optical Communication Networks, First Edition, 2016 John Wiley & Sons, Inc. Published 2016, pp. 507-545.

J. Altabas, "Cost-effective Transceiver based on a RSOA and a VCSEL for Flexible uDWDM Networks," IEEE Photonics Technology Letters ( vol. 28, Issue: 10, May 15, 15 2016, pp. 1111-1114.

K. Roberts et al., "Beyond 100 Gb/s: Capacity, Flexibility, and Network Optimization," J. Opt. Commun. Netw./vol. 9, No. 4/Apr. 2017, pp. C12-C24.

Lavery et al., "Digital Coherent Receivers for Long-Reach Optical Access Networks," Journal Of Lightwave Technology, vol. 31, No. 4, Feb. 15, 2013, pp. 609-620.

V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.

Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.

Y. Zhang et al., "Digital subcarrier multiplexing for flexible spectral allocation in optical transport network," Oct. 24, 2011 / vol. 19, No. 22 / Optics Express 21882.

R. Schmogrow et al., "Nyquist Frequency Division Multiplexing for Optical Communications," CLEO Technical Digest, OSA 2012, CTh1H.2.

P Khodashenas. "Investigation of Spectrum Granularity for Performance Optimization of Flexible Nyquist-WDM-Based Optical Networks." Journal Of Lightwave Technology, vol. 33, No. 23, Dec. 1, 2015 pp. 4767-4774.

Mishra et al., "Flexible RF-Based Comb Generator," IEEE Photonics Technology Letters, vol. 25, No. 7, Apr. 1, 2013, pp. 701-704.

M. Jinno et al., "Multiflow Optical Transponder for Efficient Multilayer Optical Networking," IEEE Communications Magazine • May 2012, pp. 56-65.

Kim Roberts, "100G and Beyond," OFC 2014, OSA 2014, Tu3J.1.

J. Fischer, "Digital signal processing for coherent UDWDM passive optical networks," ITG-Fachbericht 248: Photonische Netze 05.— May 6, 2014 in Leipzig, VDE VERLAG GMBH—Berlin—Offenbach, Germany, ISBN 978-3-8007-3604-1.

Kottke et al., "Coherent UDWDM PON with joint subcarrier reception at OLT," Optics Express, Jul. 2, 2014.

Lavery et al., "Reduced Complexity Equalization for Coherent Long-Reach Passive Optical Networks," J. Opt. Commun. Netw./vol. 7, No. 1/Jan. 2015, pp. A16-A27.

Lazaro et al., "Flexible PON Key Technologies: Digital Advanced Modulation Formats and Devices," 2014 16th International Conference on Transparent Optical Networks (ICTON), Tu.B3.2.

Optical Internetworking Forum—Technology Options for 400G Implementation OIF-Tech-Options-400G-01.0, Jul. 2015.

Riccardi et al., "Sliceable bandwidth variable transponder: the IDEALIST vision," 2015 European Conference on Networks and Communications (EuCNC), pp. 330-334.

Sambo et al., "Next Generation Sliceable Bandwidth Variable Transponders," IEEE Communications Magazine, Feb. 2015, pp. 163-171.

P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.

Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.

Schmogrow et al., "Real-Time Digital Nyquist-WDM and OFDM Signal Generation: Spectral Efficiency Versus DSP Complexity," ECOC Technical Digest, 2012 OSA, Mo.2.A.4.

Boutaba et al., "Elastic Optical Networking for 5G Transport," J Netw Syst Manage (2017) 25m pp. 819-847 123.

S. Smolorz et al., "Demonstration of a Coherent UDWDM-PON with Real-Time Processing," OFC/NFOEC 2011, PDPD4.

H. Rohde et al. "Coherent Ultra Dense WDM Technology for Next Generation Optical Metro and Access Networks," Journal Of Lightwave Technology, vol. 32, No. 10, May 15, 2014 pp. 2041-2052.

Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.

(56) References Cited

OTHER PUBLICATIONS

Rohde et al., "Digital Multi-Wavelength Generation and Real Time Video Transmission in a Coherent Ultra Dense WDM PON," OFC/NFOEC Technical Digest, 2013, OSA, OM3H.3.
International Search Report issued in connection with PCT/US2020/023871 dated Sep. 24, 2020.
Guo-Wei Lu et al., "Optical subcarrier processing for Nyquist SCM signals via coherent spectrum overlapping in four-wave mixing with coherent multi-tone pump", Optics Express, vol. 26, No. 2, Jan. 22, 2018.
International Search Report issued in connection with PCT/US2020/018180 dated Sep. 18, 2020.
International Search Report issued in connection with PCT/US2020/036209 dated Oct. 1, 2020.
International Search Report issued in connection with PCT/US2020/018292 dated Jun. 4, 2020.
International Search Report issued in connection with PCT/US2020/021024 dated Aug. 3, 2020.
Wei et al: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).
Cerisola et al., "Subcarrier multiplex of packet headers in a WDM optical network and a nouvel ultrafast header clock-recovery technique", 1995, OFC '95 Technical Digest, pp. 273-274 (Year: 1995).
Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.
K. Roberts, et al., "Performance of dual-polarization QPSK for optical transport system," JLT, vol. 27, No. 16, pp. 3546-3559, Aug. 2009.
S.J. Savory et al., "Digital equalisation of 40Gbit/s per wavelength transmission over 2480km of standard fibre without optical dispersion compensation," European Conference on Optical Communications (ECOC) 2006, paper Th2.5.5.
H. Sun et al., "Real-time measurements of a 40 Gb/S coherent system," Jan. 21, 2008, vol. 16, No. 2, Optics Express, pp. 873-879.
Greshishchev et al., "A 56GS/s 6b DAC in 65nm CMOS with 256x6b Memory", ISSCC 2011/Session 1 0/Nyquist-Rate Converters/1 0.8, 2011 IEEE International Solid-State Circuits Conference, 3 pages.
Bingham, "Multicarrier Modulator for Data Transmission: An Idea Whose Time Has Come", IEEE Communications Magazine, pp. 5-14, May 1990, 8 pages.
Yan et al. "Experimental Comparison of No-Guard-Interval-OFDM and Nyquist-WDM Superchannels", OFC/NFOEC Techincal Digest, 1/23/20212, 4 pages.
Zhuge et al., "Comparison of Intra-Channel Nonlinearity Tolerance Between Reduced-Guard-Interval CO-OFDM Systems and Nyquist Single Carrier Systems", OFC/NFOEC Technical Digest, Jan. 23, 2012, 4 pages.
Zhang et al., "3760km, 100G SSMF Transmission over Commercial Terrestrial DWDM ROADM Systems using SD-FEC", OFC/NFOEC Posteadline Papers, Mar. 2012, 3 pages.
Rahn et al., "250Gb/s Real-Time PIC-based Super-Channel Transmission Over a Gridless 6000km Terrestrial Link", OFC/NFOEC Posteadline Papers, Mar. 2013, 3 pages.

\* cited by examiner

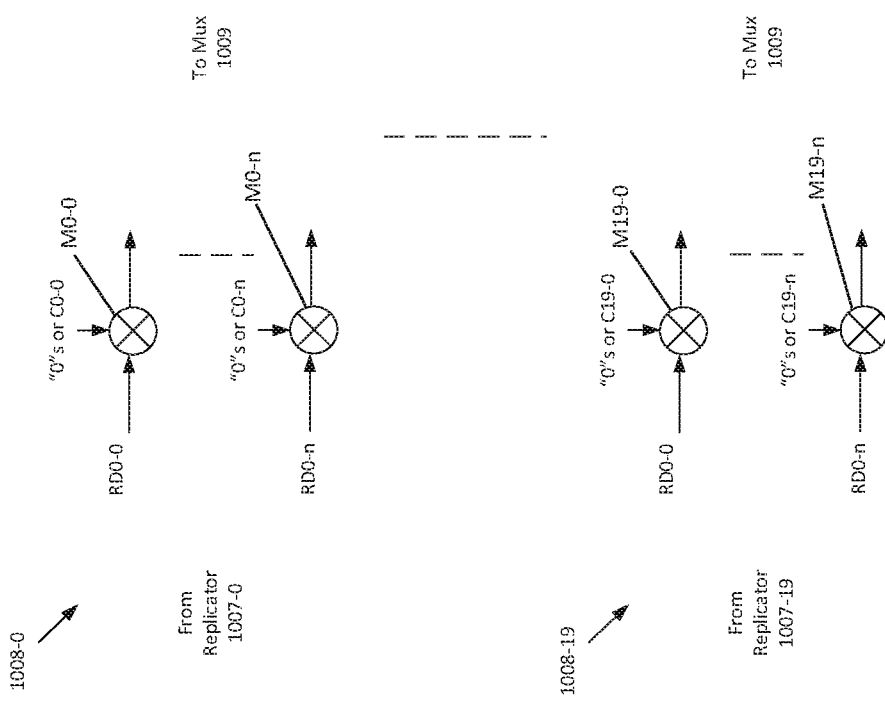

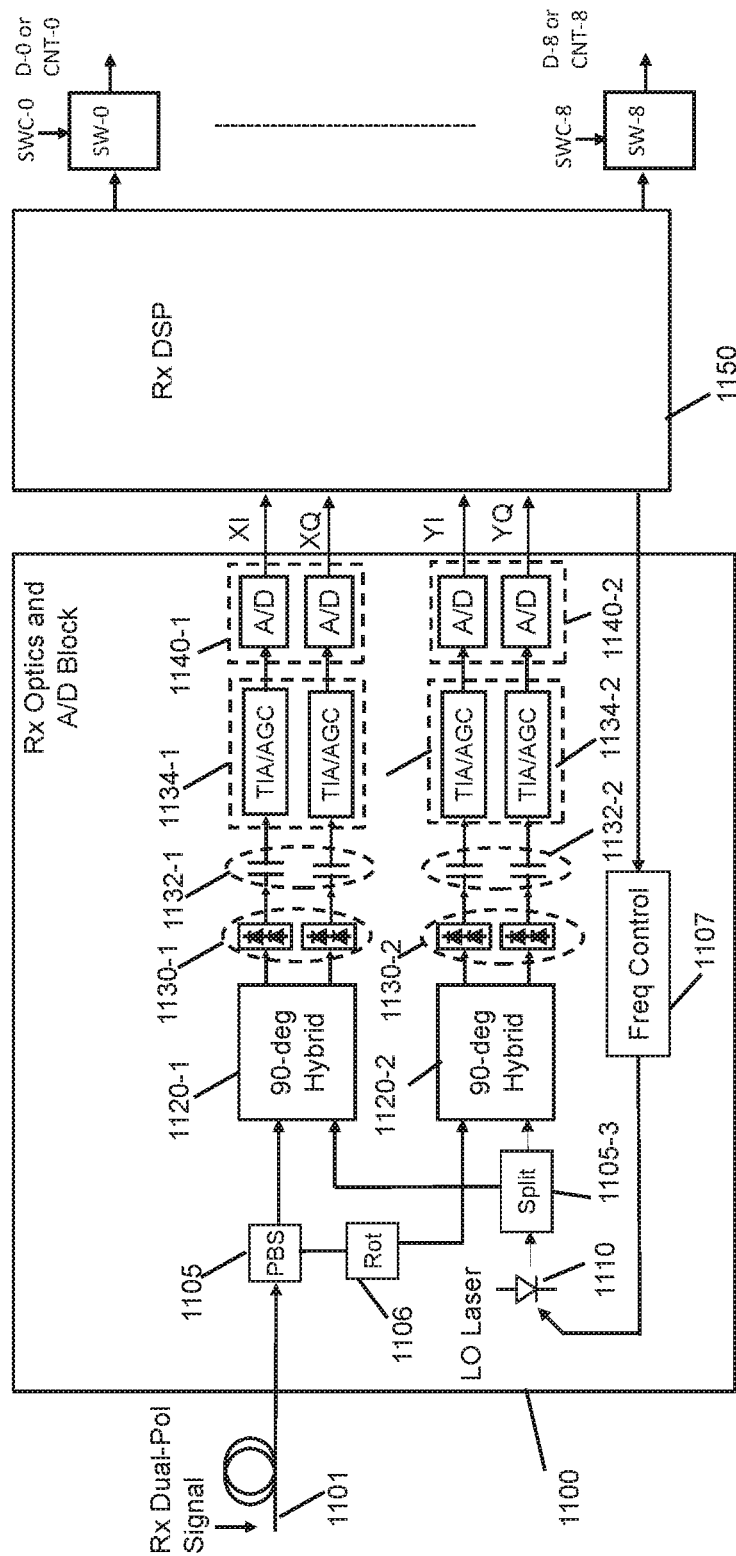
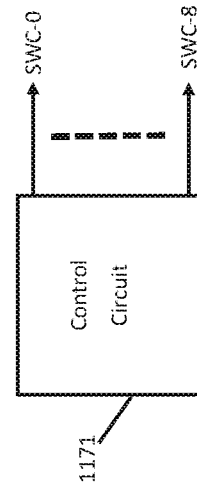
Fig. 11a
Fig. 11c

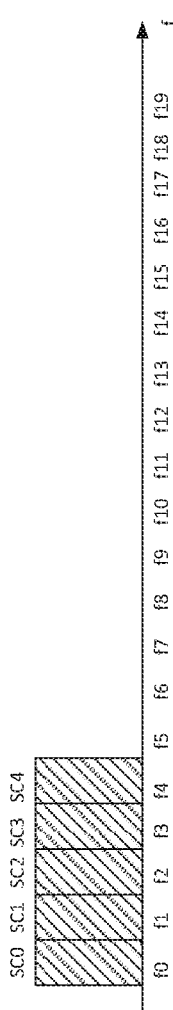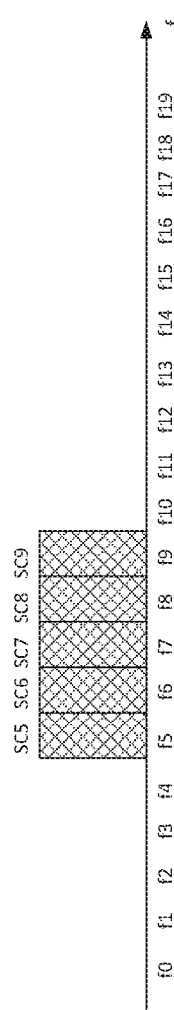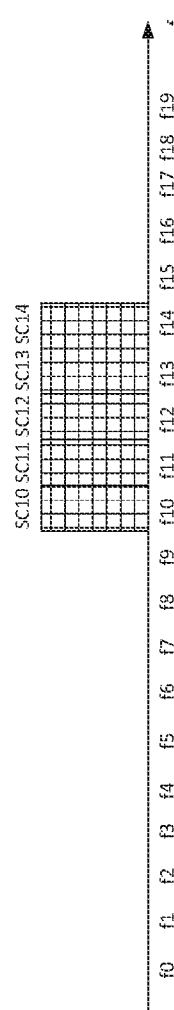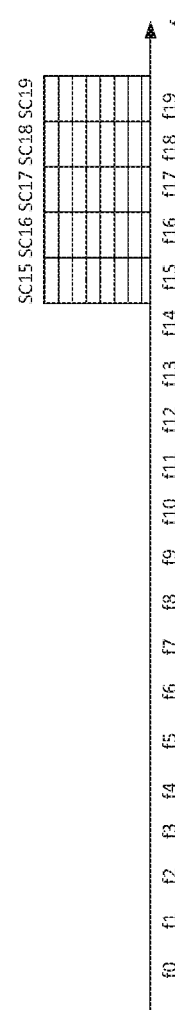

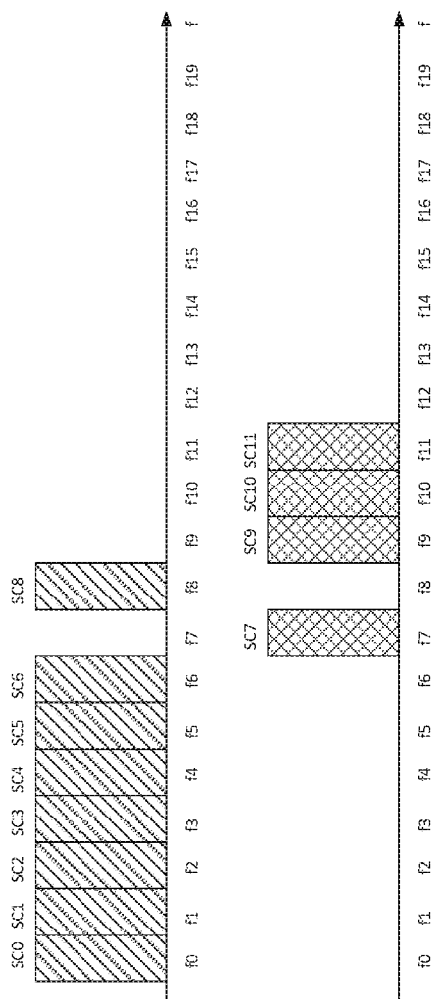
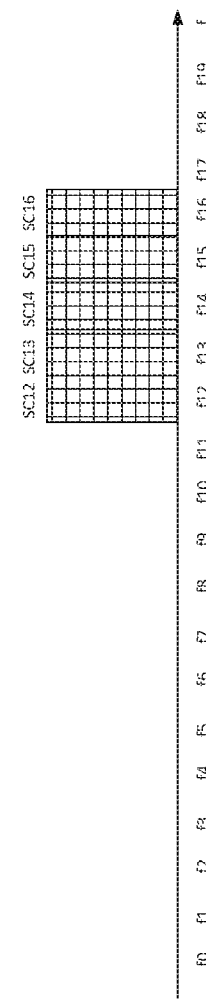
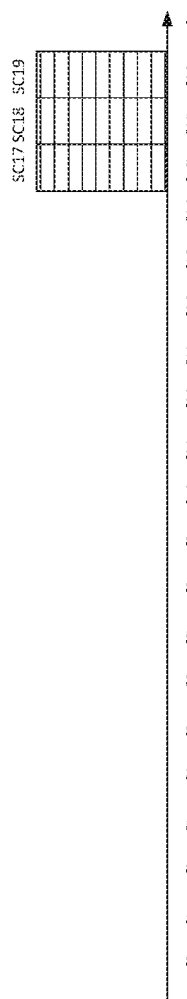
Fig. 13g
Fig. 13h
Fig. 13i
Fig. 13j

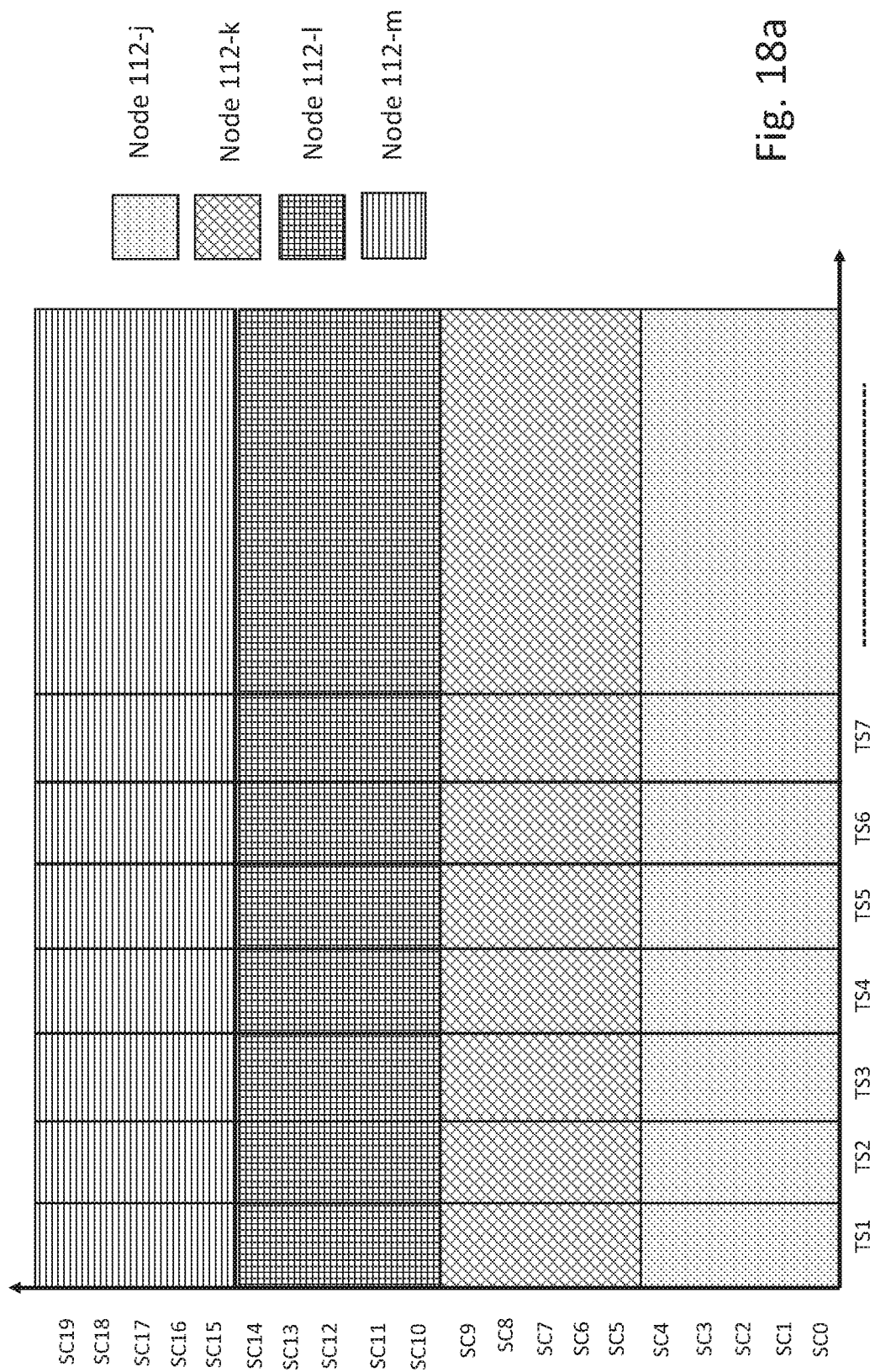

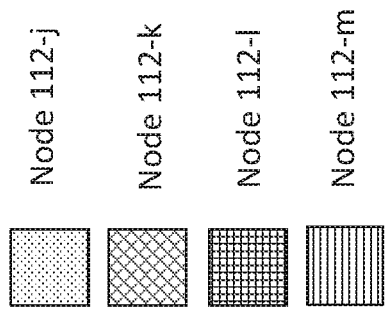
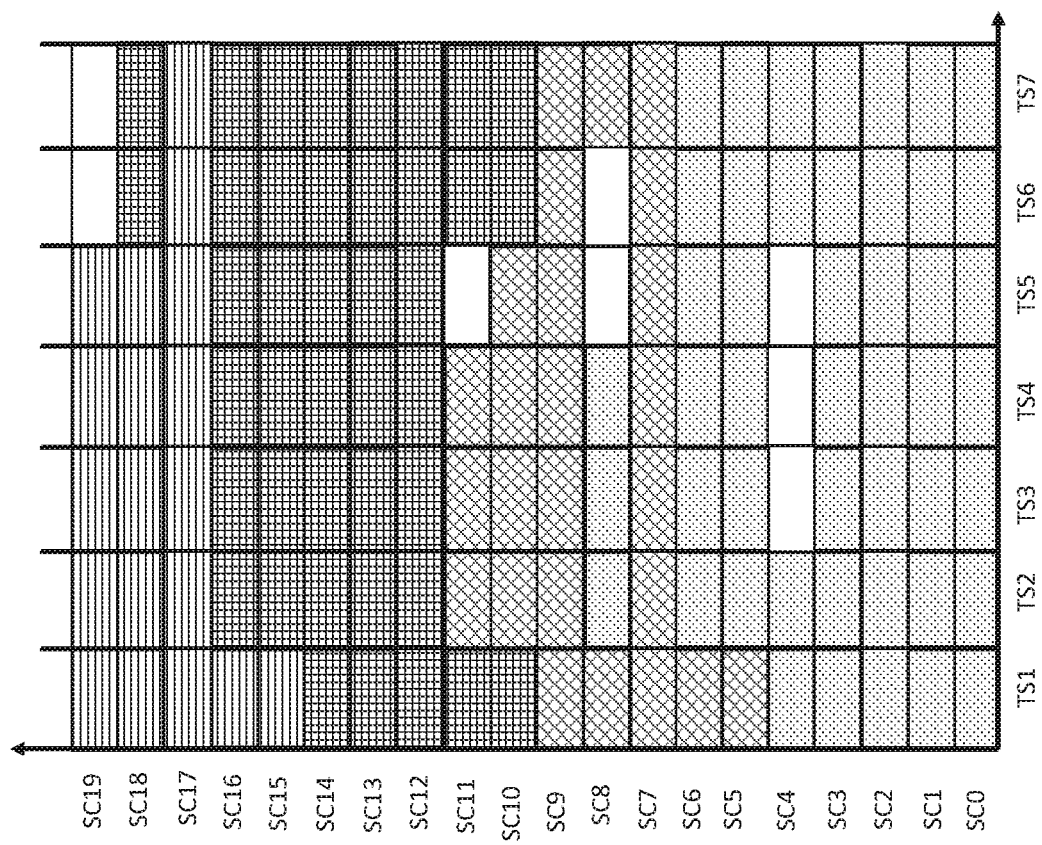
Fig. 18c

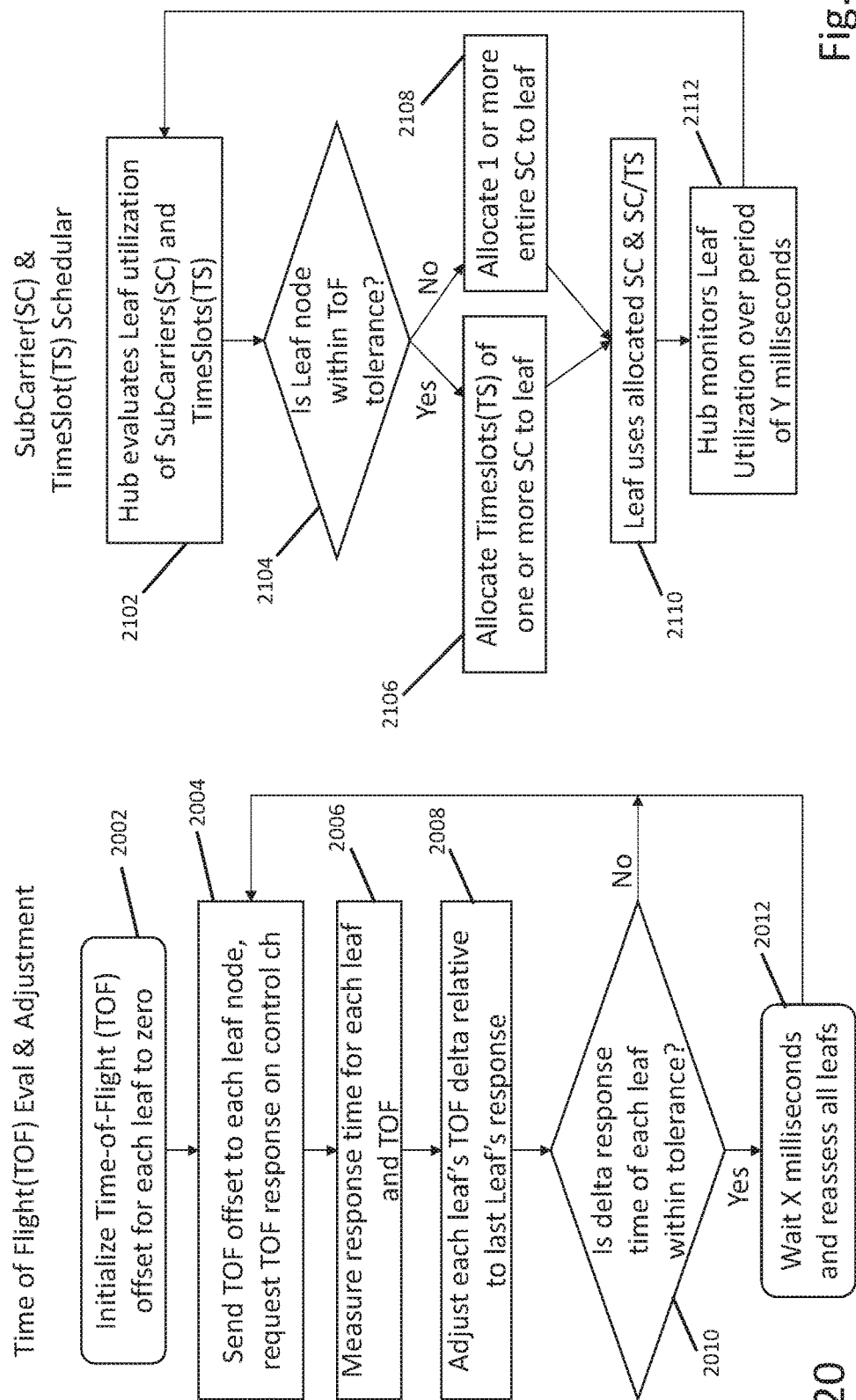

| ToF | ToF (μs) | TOF in # of TS | ToF Delta (μs) (Node 112-m – Node 112-x) | ToF Delta (μs) | ToF Delta in # of TS |
|---|---|---|---|---|---|
| Node 112-j | 300 | 1.5 | 1000 – 300 | 700 | 3.5 |
| Node 112-k | 500 | 2.5 | 1000 – 500 | 500 | 2.5 |
| Node 112-l | 600 | 3.0 | 1000 – 600 | 400 | 2 |
| Node 112-m | 1000 | 5.0 | 1000 – 1000 | 0 | 0 |

FREQUENCY DIVISION MULTIPLE ACCESS OPTICAL SUBCARRIERS

CROSS REFERENCE TO RELATED APPLICATIONS

This application claims the benefit of U.S. Provisional Patent Application No. 62/813,151, filed Mar. 4, 2019, which is incorporated herein by reference in its entirety.

BACKGROUND

In some optical communication systems, multiple optical signals, each having a corresponding wavelength, and each being modulated to carry a different data stream, are multiplexed onto an optical fiber. In such systems, a laser and a modulator may be provided to generate each optical signal. Accordingly, in order to increase the capacity of such systems, additional lasers, modulators and associated circuitry are employed. The cost associated with such systems may, therefore increase as capacity is increased. Accordingly, there is a need for a more cost-effective network requiring fewer components, such as the components described above.

Moreover, conventional optical communication systems may include high-speed circuitry and components to generate high-speed optical signals at a transmit end of the system. At a receive end, corresponding high-speed circuitry may be provided to detect the incoming data and to forward or distribute such data to lower capacity nodes. Accordingly, there is a further need to reduce costs by supplying high capacity signals to less expensive lower capacity nodes without the need for intermediate high-speed circuitry and components at the receive end of the system.

In addition, in some conventional optical communication systems, data may be transmitted as a series of frames, each of which includes a payload portion including customer or user data, and a header or overhead portion including operation, administration, and maintenance ("OAM") information associated with the system. With increasing network complexity, the amount of such control or OAM information has increased, which may limit the amount of transmitted customer data. Therefore, there is also a need to transmit OAM information more efficiently so that more customer data may be transmitted.

SUMMARY

Consistent the present disclosure, a network or system is provided in which a hub or primary node may communication with a plurality of remote nodes, such as leaf or secondary nodes. The hub node may operate or have a capacity that may be greater than that of the leaf nodes. Accordingly, relatively inexpensive leaf nodes may be deployed that receive data carrying optical signals from, and supply data carrying optical signals to, the hub node. One or more connections may couple each leaf node to the hub node, whereby each connection may include one or more spans or segments of optical fibers, optical amplifiers, optical splitters/combiners, and optical add/drop multiplexer, for example. Consistent with an aspect of the present disclosure, optical subcarriers may be transmitted over such connections, each carrying a data stream. The subcarriers may be generated by a combination of a laser and a modulator, such that multiple lasers and modulators are not required, and costs may be reduced. In addition, the subcarriers may be employed using multiple access techniques, such as frequency division multiplexing access (FDMA), whereby a given group of subcarriers is detected at a corresponding leaf node. Moreover, as the bandwidth or capacity requirements of the leaf nodes change, the number of subcarriers, and thus the amount of data provided to each node may be changed accordingly. In a further example, each subcarrier within a dedicated group of subcarriers may carry OAM or control channel information to a corresponding leaf node, and such information may be used by the leaf node to configure the leaf node to have a desired bandwidth or capacity.

The foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the invention.

Other aspects, features and advantages will be apparent from the following detailed description, the accompanying drawings, and the claims.

BRIEF DESCRIPTION OF THE DRAWINGS

FIG. 10c illustrates a portion of a primary node transmitter DSP in greater detail consistent with another aspect of the present disclosure;

FIGS. 11a and 11b show an example of a secondary node receiver consistent with the present disclosure;

FIG. 11c shows control circuit 1171 outputting control signals CNT-0 to CNT-8 shown in FIG. 11a;

FIGS. 13b to 13j are examples of spectral plots of subcarriers output from secondary nodes consistent with an additional aspect of the present disclosure;

FIGS. 17, 18a-18c, and 19 show diagrams whereby subcarrier data allocation may change over time consistent with an additional aspect of the present disclosure;

FIG. 20 is a flow chart of a method for determining time of flight and data transmission timing from consistent with an aspect of the present disclosure;

FIG. 21 is a flow chart of a method for scheduling;

FIG. 23 shows a table including time of flight (TOF) examples;

DESCRIPTION OF THE EMBODIMENTS

Reference will now be made in detail to the present embodiments of the present disclosure, examples of which are illustrated in the accompanying drawings. In general, the same reference numbers will be used throughout the drawings to refer to the same or like parts. The terms "hub," "hub node," and "primary node" are used interchangeably herein. In addition, the terms "leaf," "leaf node," and "secondary node" are used interchangeably herein.

Figure 1:
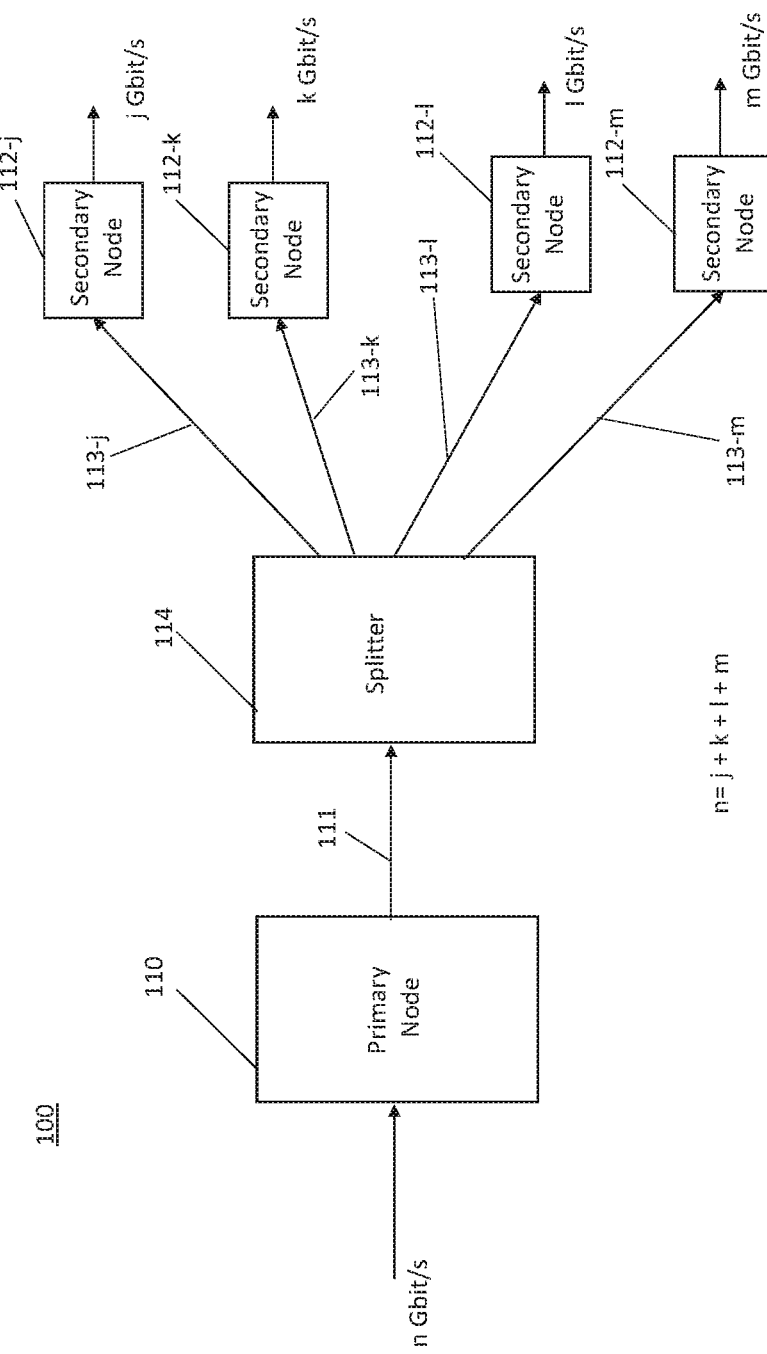
FIGS. 1 and 2 are block diagrams showing examples of networks consistent with an aspect of the present disclosure.

FIG. 1 illustrates an example of an aggregation network 100 consistent with the present disclosure in which primary node 110 may communicate with multiple secondary nodes 112-*j* to 112-*m*, which sometimes may be referred to individually or collectively as secondary node(s) 112. Secondary nodes 112, in one example, are remote from primary node 110. Primary node 110 may transmit optical subcarriers, described in greater detail below, in a downstream direction onto an optical communication path 111, which, like each of optical communication paths 113-*j* to 113-*m*, may include one or more segments of optical fiber, as well as one or more optical amplifiers, reconfigurable add-drop multiplexers (ROADMs) or other optical fiber communication equipment. Splitter 114 may be coupled to an end of optical communication path 111 to receive the optical subcarriers and provide a power split portion of each subcarrier to a corresponding one of secondary nodes 112-*j* to 112-*m* via a respective one of optical communication paths 113-*j* to 113-*m*.

As further shown in FIG. 1, primary node 110 has a data capacity to receive n Gbit/s of data (e.g., a data stream) for transmission to secondary node 112. Each secondary node 112 may receive and output to a user or customer a portion of the data input to primary node 110. In this example, secondary nodes 112-*j*, 112-*k*, 112-*l*, and 112-*m* output j Gbit/s, k Gbit/s, l Gbit/s, and m Gbit/s of data (data streams), respectively, whereby the sum of the j, k, l, and m may equal n (where j, k, l, m, and n are positive numbers).

Figure 2:
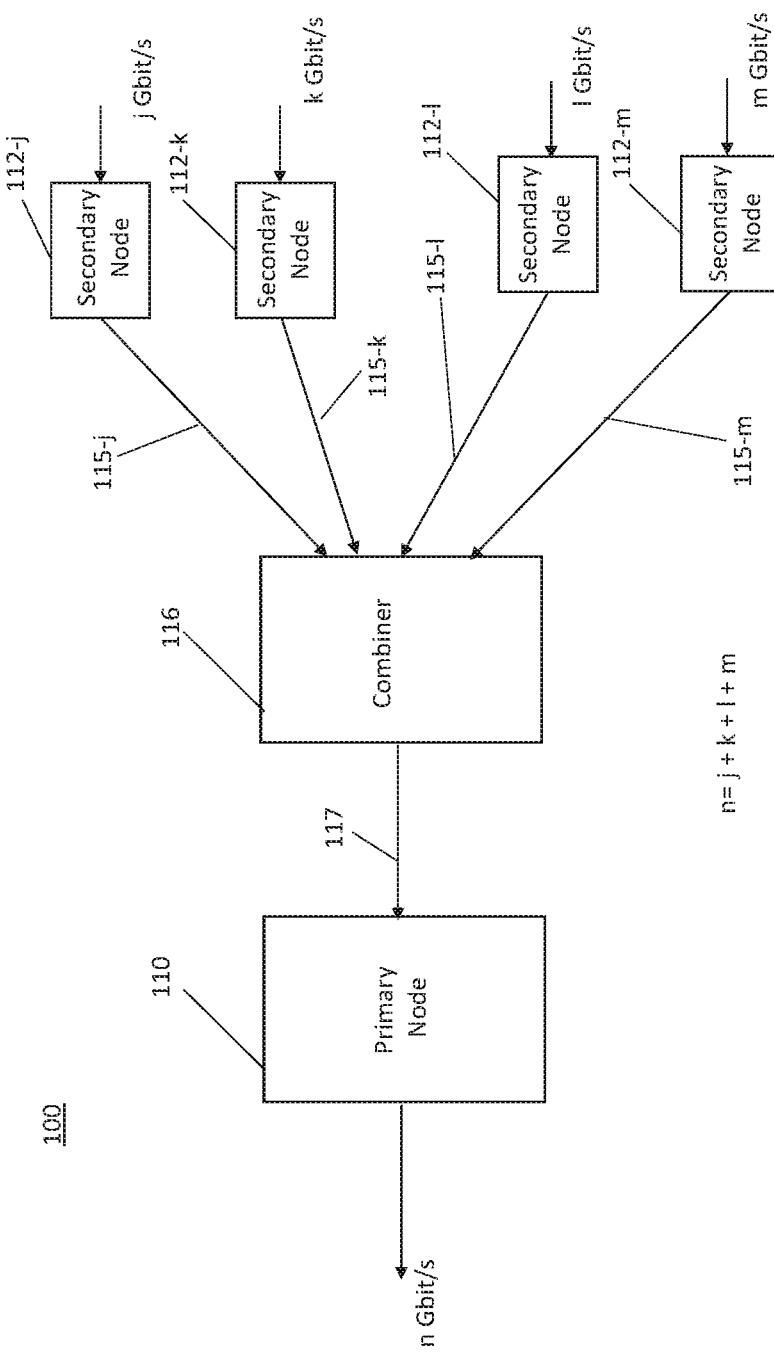

FIG. 2 show transmission of additional subcarriers in an upstream direction from secondary nodes 112-*j* to 112-*m* to primary node 110. As further shown in FIG. 2, each of secondary nodes 112-*j* to 112-*m* may transmit a corresponding group of subcarriers or one subcarrier to optical combiner 116 via a respective one of optical communication paths 115-1 to 115-*m*. Optical combiner 116 may, in turn, combine the received optical subcarriers from secondary nodes 112-*j* to 112-*m* onto optical communication path 117. Optical communication paths 115-1 to 115-*m* and 117 may have a similar construction as optical communication paths 111 and 112-1 to 112-*m*.

As further shown in FIG. 2, each of secondary nodes 112-*j* to 112-*m* receives a respective data stream having a corresponding data rate of j Gbit/s, k Gbit/s, l Gbit/s, and m Gbit/s. At primary node 110, data contained in these streams may be output such that the aggregate data supplied by primary node 110 is n Gbit/s, such that, as noted above, n may equal the sum of j, k, l, and m.

In another example, subcarriers may be transmitted in both an upstream and downstream direction over the same optical communication path. In particular, selected subcarriers may be transmitted in the downstream direction from primary node 110 to secondary nodes 112, and other subcarriers may be transmitted in the upstream direction from secondary nodes 112 to primary node 110.

In some implementations, network 100 may include additional primary and/or secondary nodes and optical communication paths, fewer primary and/or secondary nodes and optical communication paths, or may have a configuration different from that described above. For example, network 100 may have a mesh configuration or a point-to-point configuration.

Figure 3:
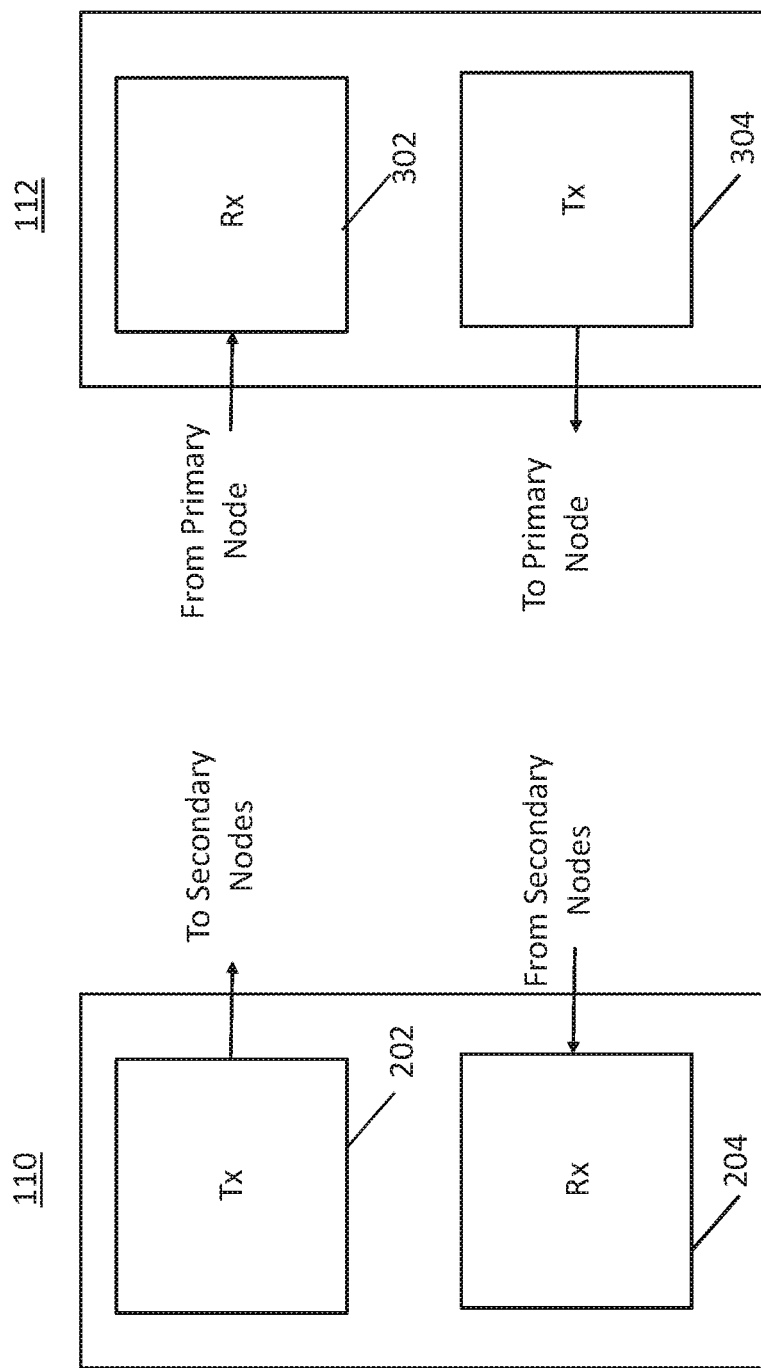
FIG. 3 is a block diagram showing an example of a primary node and secondary node, respectively, in accordance with an additional aspect of the present disclosure.

FIG. 3 illustrates primary node 110 in greater detail. Primary node 110 may include a transmitter 202 that supplies a downstream modulated optical signal including subcarriers, and a receiver that 204 that may receive upstream subcarriers carrying data originating from the secondary nodes, such as nodes 112-*j* to 112-*m*.

FIG. 3 further shows a block diagram of one of secondary nodes 112, which may include a receiver circuit 302 that receives one or more downstream transmitted subcarriers, and a transmitter circuit 304 that transmits one or more subcarriers in the upstream direction.

Figure 4:
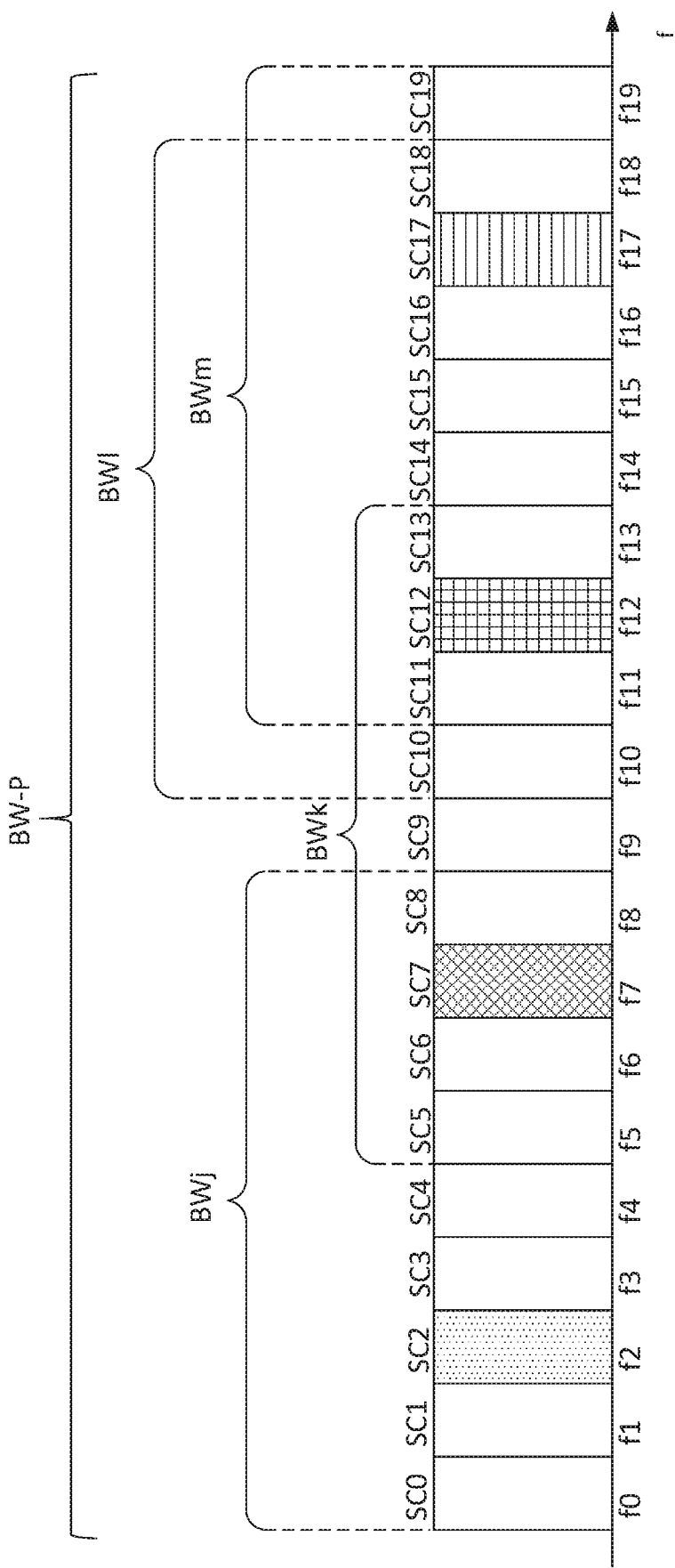
FIG. 4 is an example of a spectral plot showing optical subcarriers consistent with an aspect of the present disclosure.

FIG. 4 illustrates an example of a transmission spectrum that can accommodate twenty subcarriers (SC0 to SC19) that may be output from primary node transmitter 202. Each of subcarriers SC0 to SC19 has a corresponding one of frequencies f0 to f19. Subcarriers SC0 to SC19, in one example, are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

As noted above, each of secondary nodes 112 may include less expensive components than the components included in primary node 110. Accordingly, the bandwidth or the data capacity of the secondary nodes 112 may be less than that associated with primary node 110, such that the capacity associated with each secondary node 112 is less than that of primary node 110.

For example, as further shown in FIG. 4, primary node 110 may have a bandwidth BW-P, such that the data carried by each of subcarriers SC1 to SC20 may be processed, recovered, and output either from transmitter 202 or received from receiver 204. On the other hand, each of secondary nodes 112-*j* to 112-*m* may have a respective one of bandwidths BWj to BWm, such that each secondary node has a data processing capacity or is capable of processing and outputting data carried by up to nine subcarriers, in this example.

As noted above, in order to reduce network costs, less expensive components, such as optical components and certain electrical components, may, in certain examples, be capable of processing signal over of a limited frequency range or bandwidth that is less than the range of signal frequencies that may be accommodated by the optical and electrical components in primary node 110. For example, electrical components, such as digital-to-analog (DACs), analog-to-digital converters (ADCs), and digital signal processors (DSPs), and optical components, such as modulators, in secondary nodes 112 may have an associated bandwidth that is less than corresponding, albeit more expensive, components in primary node 110.

Example bandwidths of each of secondary nodes 112 are further shown in FIG. 4. Namely, bandwidth BWj associated with secondary node 112-*j* extends over or encompasses a range including frequencies f0 to f8 of subcarriers SC0 to SC8, respectively; bandwidth BWk associated with secondary node 112-*k* extends over or encompasses a range including frequencies f5 to f13 of subcarriers SC5 to SC13, respectively; bandwidth BWl associated with secondary node 112-*l* extends over or encompasses a range including frequencies f10 to f18 of subcarriers SC10 to SC18, respectively; and bandwidth BWm associated with secondary node 112-*m* extends over or encompasses a range including frequencies f11 to f19 of subcarriers SC11 to SC19, respectively. On the other hand, the bandwidth of primary node 110, BW-P, encompasses the entire range of frequencies f0-f19 of subcarriers SC0 to SC19.

As further shown in FIG. 4, certain subcarriers have frequencies that fall within multiple bandwidths. For example, subcarriers SC5 and SC6 have frequencies that fall within bandwidth BWj and bandwidth BWk. The data carried by such subcarriers may, therefore, be detected and selectively output from either secondary node 112-*j* or 112-*k*. For example, if a customer requires that more data be received and output from secondary node 112-*k* and less data be output from secondary node 112-*j*, nodes 112-*j* and 112-*k* may be controlled or dynamically configured such that the data carried by subcarriers SC5 and SC6 may be assigned to and output from secondary node 112-*k*, but not secondary node 112-*j*. Accordingly, as described in greater detail below, the data output from each node may be adapted to customer requirements that vary over time.

As further shown in FIG. 4, certain subcarriers, such as subcarriers SC2, SC7, SC12, and SC17, may be designated or dedicated to carry information related to a parameter or characteristic associated with one or more of secondary nodes 112. For example, such parameters may correspond to an amount of data, data rate, or capacity to be output by one or more secondary nodes. In particular, such subcarriers may carry information, for example, to configure or adjust the amount of data, capacity or data rate of data output from secondary nodes 112-*j* to 112-*m*, respectively, as noted above. In a further example, each of these subcarriers may carry user or customer data (also referred to as client data) in addition to control information. In the example shown in FIG. 4, only subcarriers SC2, SC7, SC12, and S17 are transmitted.

In a further example, subcarriers SC2, SC7, SC12, and SC17 are modulated to carry control or OAM information and related data corresponding to parameters associated therewith, such as the capacity and status of nodes 112. In an additional example, subcarrier SC2 is modulated carry such control and parameter information associated with node 112-*j*, subcarrier SC7 is modulated to carry such control and parameter information associated with node 112-*k*, subcarrier SC12 is modulated to carry such control and parameter information associated with node 112-*l* and subcarrier SC17 is modulated to carry such control and parameter information associated with node 112-*m*. In a further example, such SCs are modulated to carry information related to a parameter associated the timing and scheduling of data transmission from the nodes 112 to primary node 110, as described in detail below with respect to FIGS. 19-24.

Figure 5:
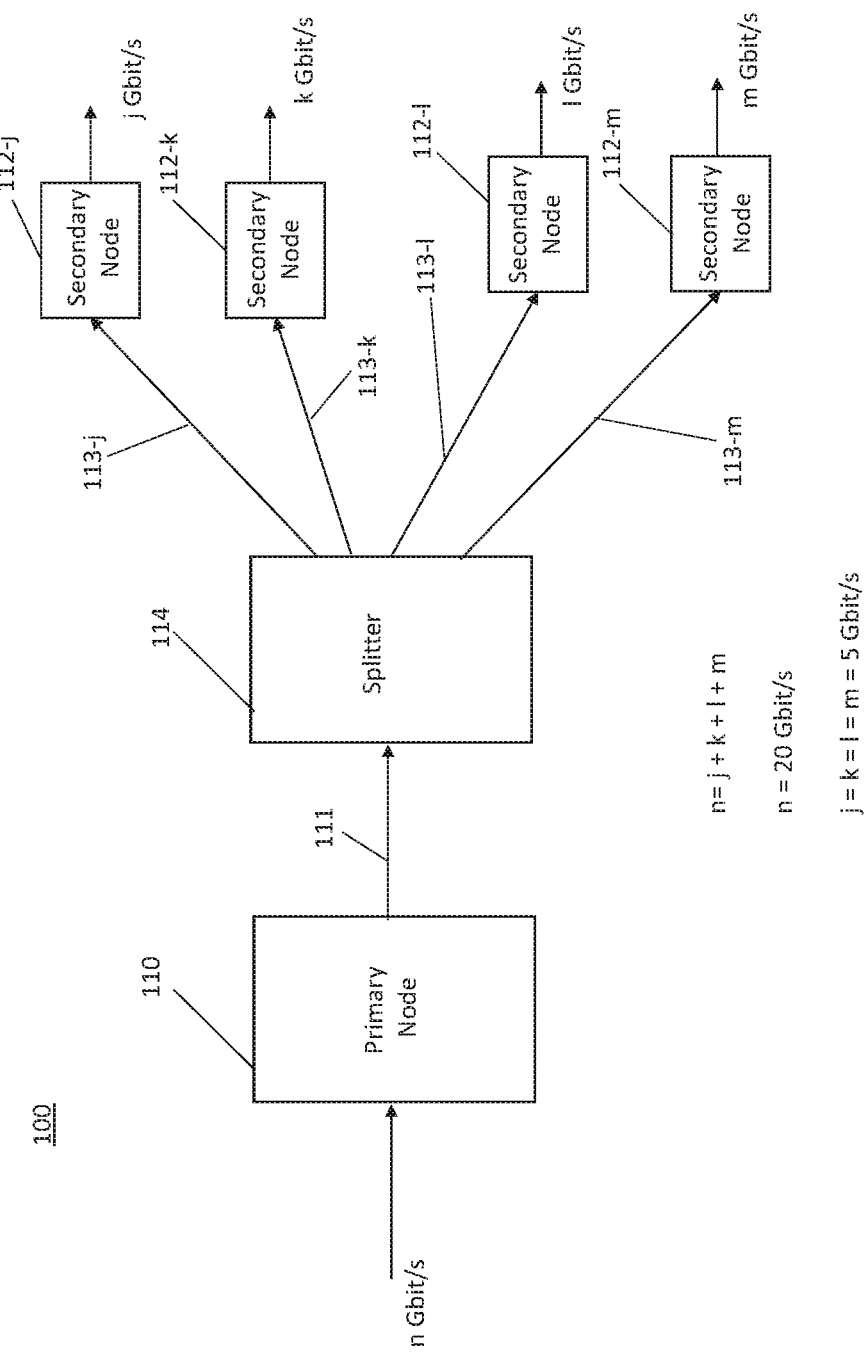
FIG. 5 is a block diagram showing an example of a network consistent with a further aspect of the present disclosure.
Figure 6:
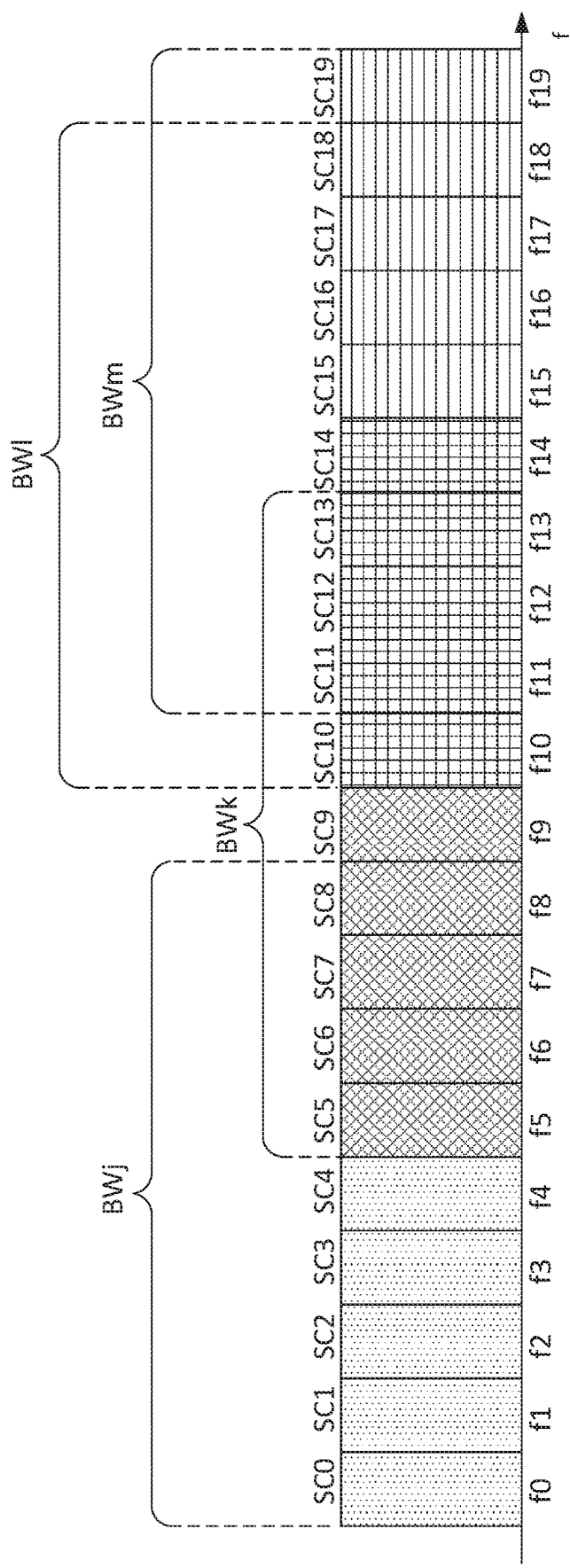
FIG. 6 is an example of a spectral plot showing optical subcarriers consistent with an additional aspect of the present disclosure.

FIG. 5 illustrates an example in which each of secondary nodes 112-*j* to 112-*m* outputs equal amounts of user data originating from primary node 110, and FIG. 6 illustrates how subcarriers SC0 to SC19 may be assigned or associated with each secondary node 112 to meet the data allocation shown in FIG. 5. In addition, in the example shown in FIGS. 5 and 6, the aggregate data input to primary node 110 may be 20 Gbit/s (n=20), and each of secondary nodes 112 outputs an equal portion of such data, i.e., 5 Gbit/s, whereby j=k=l=m=5. Put another way, based on control information received by node 112-*j*, for example, data assocai Here, subcarriers SC0, SC1, SC3, and SC4 may be assigned to secondary node 112-*j* (subcarrier SC2 further being assigned to and carrying control channel information for secondary node 112-*j*); subcarriers SC5, SC6, SC8, and SC9 may assigned to secondary node 112-*k* (subcarrier SC7 further being assigned to and carrying control channel information for secondary node 112-*k*); subcarriers SC10, SC11, SC113, and SC14 may assigned to secondary node 112-*l* (subcarrier SC12 further being assigned to and carrying control channel information for secondary node 112-*l*); and subcarriers SC15, SC16, SC18, and SC19 may assigned to secondary node 112-*m* (subcarrier SC17 further being assigned to and carrying control channel information for secondary node 112-*m*). Each subcarrier, in this example, may have an associated data rate of 1 Gbit/s.

Put another way, based on control information received by node 112-*j* carried by subcarrier SC2, for example, a first portion of data input to DSP 902 described below and associated with subcarriers SC0, SC1, SC3, and SC4 is output from node 112-*j*, as well as any user data carried by subcarrier SC2. Further, based on control information received by node 112-*k* carried by subcarrier SC7, for example, a second portion of data input to DSP 902 and associated with subcarriers SC5, SC6, SC8, and SC9 is output from node 112-*k*, as well as any user data carried by subcarrier SC7.

Figure 7:
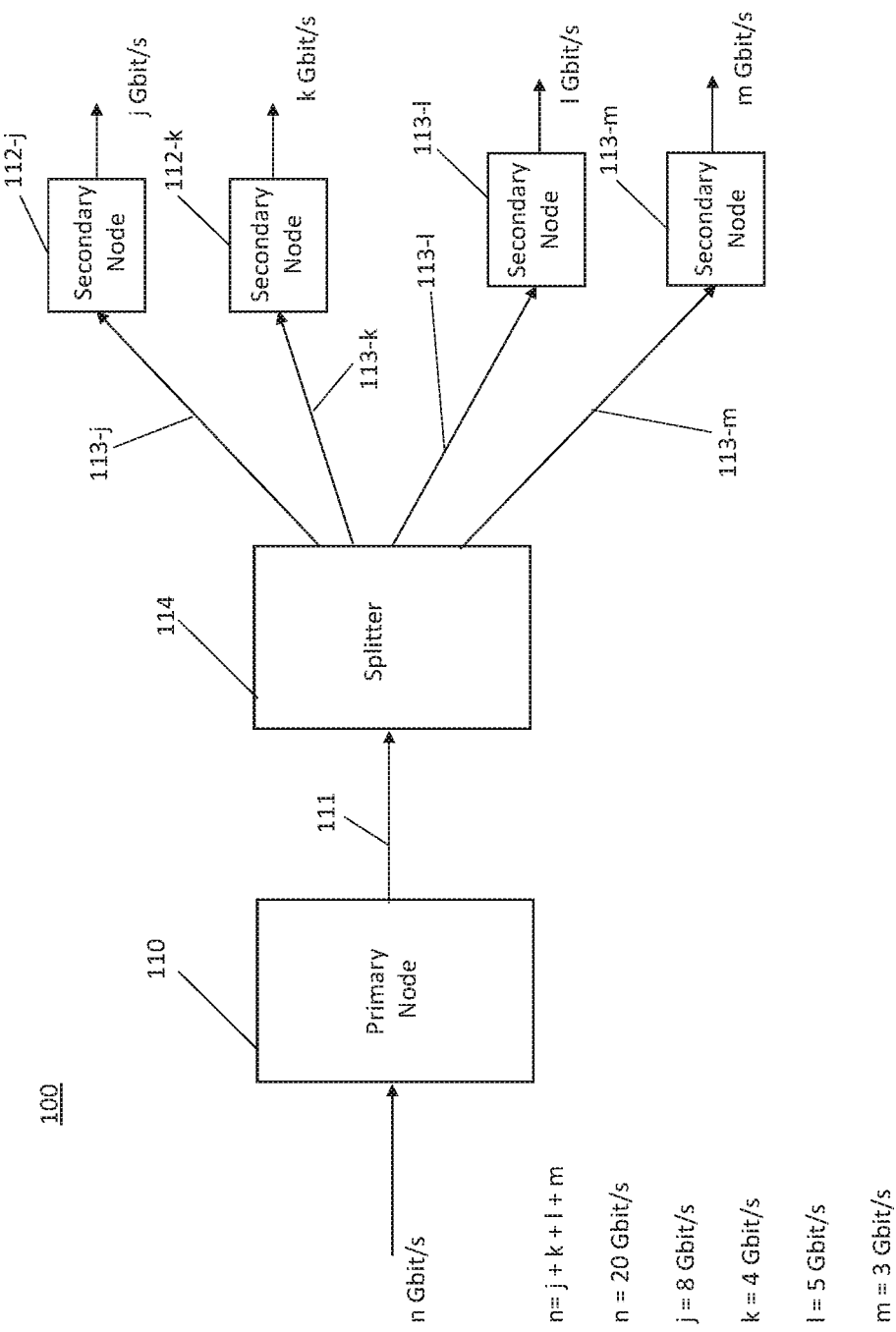
FIG. 7 is a block diagram showing an example of a network consistent with an additional aspect of the present disclosure.
Figure 8:
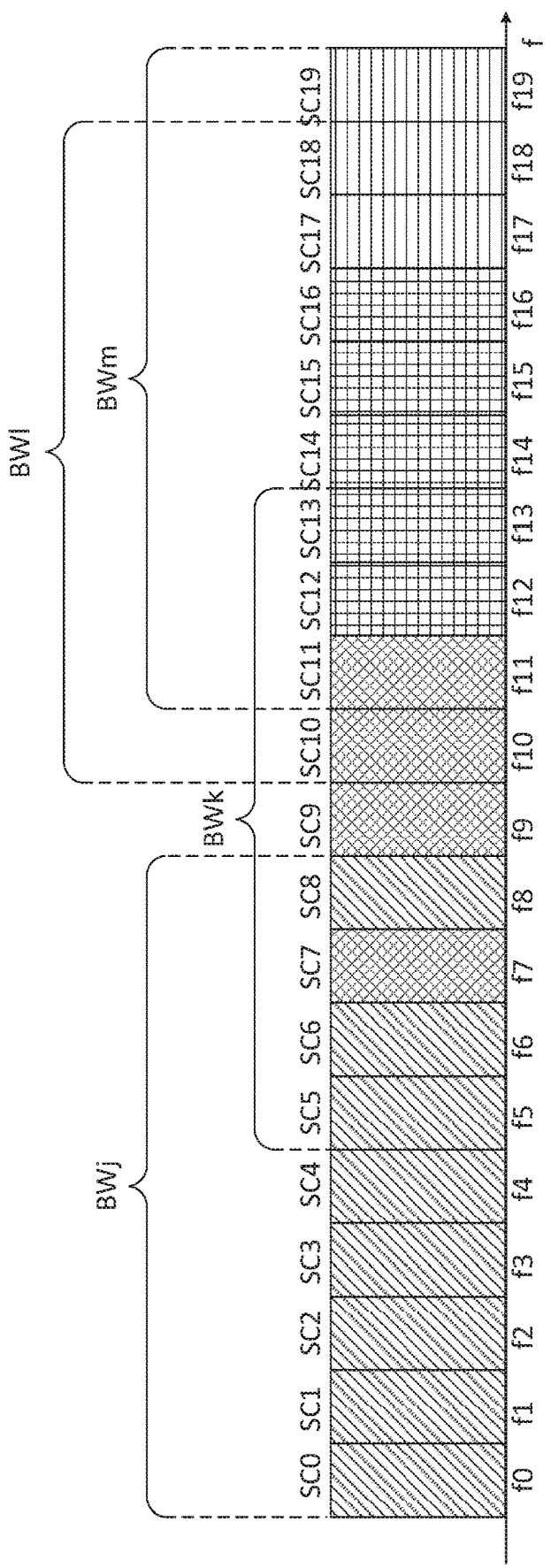
FIG. 8 is an example of a spectral plot showing optical subcarriers consistent with a further aspect of the present disclosure.

FIG. 7 illustrates another example in which the data allocation to secondary nodes 112-*j* to 112-*m* may be changed based on, for example, changing capacity requirements. For example, at a point later in time than that associated with the subcarrier allocation shown in FIG. 6, node 112-*j*, for example, may require more data than node 112-*k*. Here, control information carried by subcarriers SC2, SC7, SC12, and SC17. FIG. 8 illustrates how subcarriers SC0 to SC19 may be assigned or associated with each secondary node 112 to satisfy the data allocation shown in FIG. 7. In this example, secondary node 112-*j* is allocated the maximum data capacity, i.e., data carried by seven subcarriers (SC0, SC1 to SC3-SC6, and SC8) as well as any customer data that may be carried by subcarrier SC2; secondary node 112-$k$ is allocated ⅓ (i.e., ⅜) the maximum data capacity, i.e., data carried by three subcarriers (SC9-SC11) as well as any customer data that may be carried by subcarrier SC7; secondary node 112-$l$ is allocated ⅝ the maximum data capacity, i.e., data carried by four subcarriers (SC13-SC16) as well as any customer data that may be carried by subcarrier SC12; and secondary node 112-$m$ is allocated a ⅓ (i.e., ⅜) the maximum data capacity, i.e., data carried by two subcarriers (SC18 and SC19) as well as any customer data that may be carried by subcarrier SC17.

That is, in the example described above in connection with FIG. 8, based on additional (third) control information received by node 112-$j$ carried by subcarrier SC2, for example, a third portion of data input to DSP 902 associated with subcarriers SC0, SC1, SC3-SC6, and SC8 is output from node 112-$j$, as well as any user data carried by subcarrier SC2. Also, based on (fourth) control information received by node 112-$k$ carried by subcarrier SC7, for example, a fourth portion of data input to DSP 902 and associated with subcarriers SC9-SC11, is output from node 112-$k$, as well as any user data carried by subcarrier SC7.

Thus, by communicating control information to secondary nodes the amount of data allocated, e.g., the data rate, for output from each secondary node 112 may be controlled or varied over time based on such control information. In the examples discussed above, the control information may identify the subcarriers associated with each node, and, therefore, the amount of data or data rate allocated to each node based on the number of subcarriers carrying data to be output from such node. Such allocation, as noted above, may be changed dynamically, for example, in accordance with varying data traffic requirements in network 100, and such allocation information may be carried, for example, by selected or dedicated subcarriers, as noted above, such as subcarriers SC2, SC7, SC12, and SC17.

Data allocation and subcarrier transmission are described next with reference to FIGS. 9 and 10$a$-10$c$.

Figure 9:
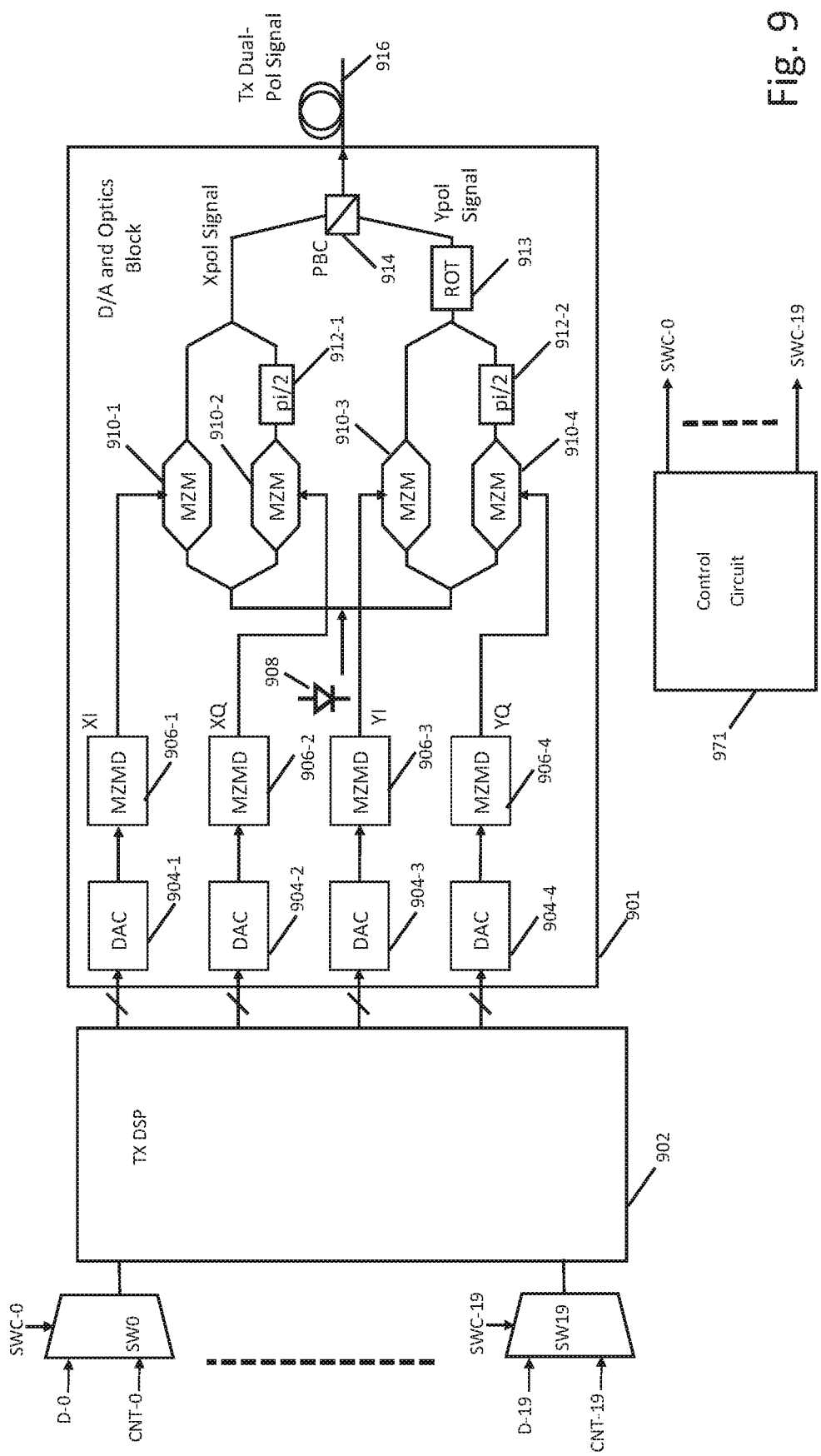
FIG. 9 shows an example of a primary node transmitter consistent with the present disclosure.

FIG. 9 illustrates transmitter 202 of primary node 110 in greater detail. Transmitter 202 includes a plurality of circuits or switches SW, as well as a transmitter DSP (TX DSP) 902 and a D/A and optics block 901. In this example, twenty switches (SW-0 to SW-19) are shown, although more or fewer switches may be provided than that shown in FIG. 9. Each switch may have, in some instances, two inputs: the first input may receive user data, and the second input may receive control information or signals (CNT). Each switch SW-0 to SW-19 can receive a respective one of control signals SWC-0 to SWC-19 output from control circuit 971, which may include a microprocessor, field programmable gate array (FPGA), or other processor circuit. Based on the received control signal, each switch SW-0 to SW19 selectively outputs any one of the data streams D-0 to D-19, or a control signal CNT-0 to CNT-19. Control signals CNT can be any combination of configuration bits for control and/or monitoring purposes. For example, control signals CNT may include instructions to one or more of secondary nodes 112 to change the data output from such secondary nodes 112, such as by identifying the subcarriers associated with such data. In another example, the control signals may include a series of known bits used in secondary nodes 112 to "train" the receiver to detect and process such bits so that the receiver can further process subsequent bits. In a further example, the control channel CNT includes information that may be used by the polarization mode dispersion (PMD) equalizer circuits 1125 discussed below to correct for errors resulting from polarization rotations of the X and Y components of one or more subcarriers (SC). In a further example, control information CNT is used to restore or correct phase differences between laser transmit-side laser 908 and a local oscillator laser 1110 in each of the secondary nodes 112. Such detected phase differences may be referred to as cycle slips. In a further example, control information CNT may be used to recover, synchronize, or correct timing differences between clocks provided in the primary (110) and secondary nodes 112.

In another, example, one or more of switches SW may be omitted, and control signals CNT may be supplied directly to DSP 902. Moreover, each input to DSP 902, such as the inputs to FEC encoders 1002 described below (see FIG. 10$a$), receives, in another example, a combination of control information described above as well as user data.

In a further example, control signal CNT includes information related to the number of subcarriers that may be output from each of secondary nodes 112. Such selective transmission of subcarriers is described with reference to FIGS. 10$a$-10$c$. Although such description is in connection with primary node DSP 902, similar circuitry may be included in the secondary node TX DSP 1302 (FIG. 13) to adjust or control the number of subcarriers output therefrom.

Based on the outputs of switches SW-0 to SW-19, DSP 902 may supply a plurality of outputs to D/A and optics block 901 including digital-to-analog conversion (DAC) circuits 904-1 to 904-4, which convert digital signal received from DSP 902 into corresponding analog signals. D/A and optics block 901 also includes driver circuits 906-1 to 906-2 that receive the analog signals from DACs 904-1 to 904-4 and adjust the voltages or other characteristics thereof to provide drive signals to a corresponding one of modulators 910-1 to 910-4.

D/A and optics block 901 further includes modulators 910-1 to 910-4, each of which may be, for example, a Mach-Zehnder modulator (MZM) that modulates the phase and/or amplitude of the light output from laser 908. As further shown in FIG. 9, light output from laser 908, also included in block 901, is split such that a first portion of the light is supplied to a first MZM pairing, including MZMs 910-1 and 910-2, and a second portion of the light is supplied to a second MZM pairing, including MZMs 910-3 and 910-4. The first portion of the light is split further into third and fourth portions, such that the third portion is modulated by MZM 910-1 to provide an in-phase (I) component of an X (or TE) polarization component of a modulated optical signal, and the fourth portion is modulated by MZM 910-2 and fed to phase shifter 912-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 910-3 to provide an I component of a Y (or TM) polarization component of the modulated optical signal, and the sixth portion is modulated by MZM 910-4 and fed to phase shifter 912-2 to shift the phase of such light by 90 degrees to provide a Q component of the Y polarization component of the modulated optical signal.

The optical outputs of MZMs 910-1 and 910-2 are combined to provide an X polarized optical signal including I and Q components and are fed to a polarization beam combiner (PBC) 914 provided in block 901. In addition, the outputs of MZMs 910-3 and 910-4 are combined to provide an optical signal that is fed to polarization rotator 913, further provided in block 901, that rotates the polarization of such optical signal to provide a modulated optical signal having a Y (or TM) polarization. The Y polarized modulated optical signal also is provided to PBC 914, which combines the X and Y polarized modulated optical signals to provide a polarization multiplexed ("dual-pol") modulated optical signal onto optical fiber 916, for example, which may be included as a segment of optical fiber in optical communication path 111.

The polarization multiplexed optical signal output from D/A and optics block 401 includes subcarriers SC0-SC19 noted above, such that each subcarrier has X and Y polarization components and I and Q components. Moreover, each subcarrier SC0 to SC19 may be associated with or corresponds to a respective one of the outputs of switches SW-0 to SW-19. In one example, switches SW2, SW7, SW12, and SW17 may supply control information carried by a respective one of control signals CNT-2, CNT-7, CNT-12, and CNT-17 to DSP 902. Based on such control signals, DSP 902 provides outputs that result in optical subcarriers SC2, SC7, SC12, and SC17 carrying data indicative of the control information carried by CNT-2, CNT-7, CNT-12, and CNT-17, respectively, as shown in FIGS. 4, 6, and 8. In addition, remaining subcarriers SC0, SC1, SC3 to SC6, SC8 to SC11, SC13 to SC16, and SC18 to SC20 carry information indicative of a respective one of data streams D-0, D-1, D-3-D-6, D-8 to D-11, D-13 to D-16, and D-18 to D-20 output from a corresponding one of switches SW0, SW1, SW3 to SW-6, SW-8 to SW11, SW13 to SW16, and SW18 to SW20, as further shown in FIGS. 4, 6, and 8.

Figure 10A:
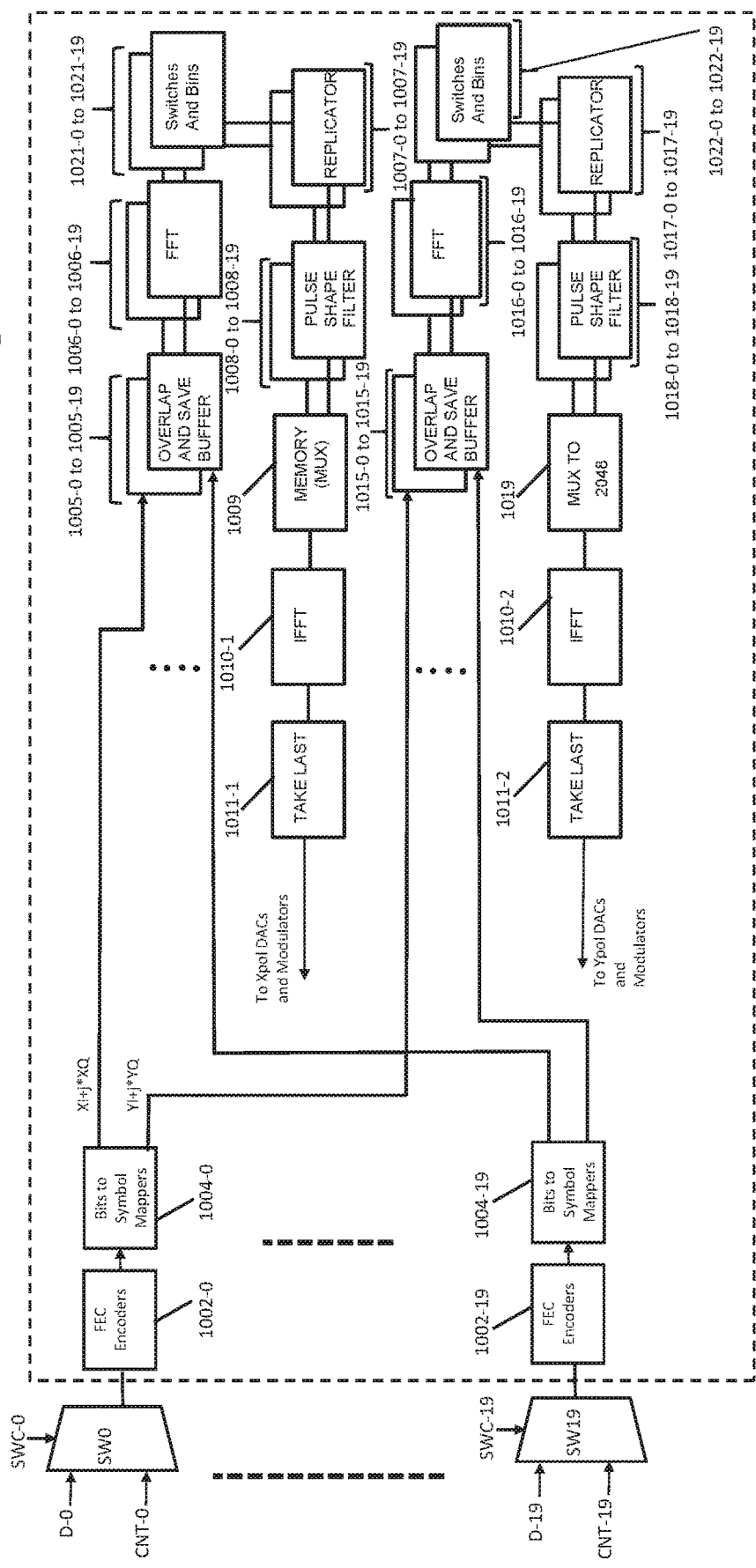
FIG. 10a is a block diagram showing an example of a primary node transmitter digital signal processor (DSP) consistent with a further aspect of the present disclosure.

FIG. 10*a* shows an example of TX DSP 902 in greater detail. TX DSP 902 may include FEC encoders 1002-0 to 1002-19, each of which may receive a respective one of a plurality of the outputs from switches SW0 to SW19. FEC encoders 1002-0 to 1002-19 carry out forward error correction coding on a corresponding one of the switch outputs, such as, by adding parity bits to the received data. FEC encoders 1002-0 to 1002-19 may also provide timing skew between the subcarriers to correct for skew induced by link between nodes 110 and 112-*j* to 112-*m* described above. In addition, FEC encoders 1002-0 to 1002-19 may interleave the received data.

Each of FEC encoders 1002-0 to 1002-19 provides an output to a corresponding one of a plurality of bits-to-symbol circuits, 1004-0 to 1004-19 (collectively referred to herein as "1004"). Each of bits-to-symbol circuits 1004 may map the encoded bits to symbols on a complex plane. For example, bits-to-symbol circuits 1004 may map four bits to a symbol in a dual-polarization QPSK constellation. Each of bits-to-symbol circuits 1004 provides first symbols, having the complex representation XI+j*XQ, associated with a respective one of the switch outputs, such as D-0, to DSP portion 1003. Data indicative of such first symbols is carried by the X polarization component of each subcarrier SC0-SC19.

Each of bits-to-symbol circuits 1004 further may provide second symbols having the complex representation YI+j*YQ, also associated with a corresponding output of switches SW0-SW19. Data indicative of such second symbols, however, is carried by the Y polarization component of each of subcarriers SC-0 to SC-19.

Such mapping, as carried by about circuit 1004-0 to 1004-19 define, in one example, a particular modulation format for each subcarrier. That is, such circuit may define a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, or 64) format. In another example, one or more of the optical subcarriers may have a modulation format that is different than the modulation format of other optical subcarriers. That is, one of the optical subcarriers have a QPSK modulation format and another optical subcarrier has a different modulation format, such as 8-QAM or 16-QAM. In another example, one of the optical subcarriers has an 8-QAM modulation format and another optical subcarrier has a 16 QAM modulation format. Accordingly, although all the optical subcarriers may carry data at the same data and or baud rate, consistent with an aspect of the present disclosure one or more of the optical subcarriers may carry data at a different data or baud rate than one or more of the other optical subcarriers. Moreover, modulation formats, baud rates and data rates may be changed over time depending on capacity requirements, for example. Adjusting such parameters may be achieved, for example, by applying appropriate signals to mappers 1004 based on control information or data described herein and the communication of such data as further disclosed herein between hub and leaf nodes.

As further shown in FIG. 10*a*, each of the first symbols output from each of bits-to-symbol circuits 1004 is supplied to a respective one of first overlap and save buffers 1005-0 to 1005-19 (collectively referred to herein as overlap and save buffers 1005) that may buffer 256 symbols, for example. Each of overlap and save buffers 1005 may receive 128 of the first symbols or another number of such symbols at a time from a corresponding one of bits to symbol circuits 1004. Thus, overlap and save buffers 1005 may combine 128 new symbols from bits to symbol circuits 1005, with the previous 128 symbols received from bits to symbol circuits 1005.

Each overlap and save buffer 1005 supplies an output, which is in the time domain, to a corresponding one of fast Fourier Transform (FFT) circuits 1006-0 to 1006-19 (collectively referred to as "FFTs 1006"). In one example, the output includes 256 symbols or another number of symbols. Each of FFTs 1006 converts the received symbols to the frequency domain using or based on, for example, a fast Fourier transform. Each of FFTs 1006 may provide the frequency domain data to bins and switches blocks 1021-0 to 1021-19. As discussed in greater detail below, bins and switches blocks 1021 include, for example, memories or registers, also referred to as frequency bins (FB) or points, that store frequency components associated with each subcarrier SC.

Figure 10B:
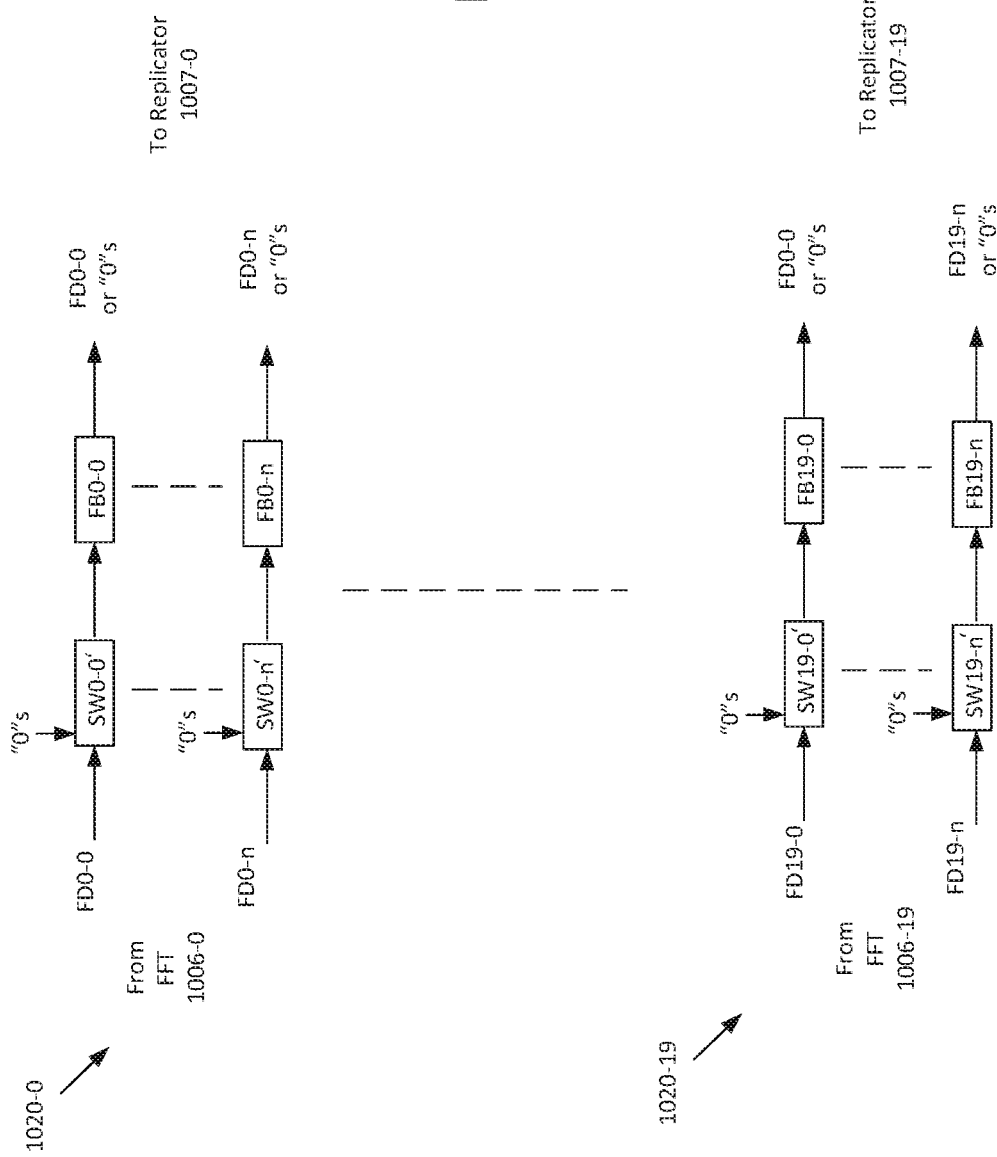
FIG. 10b illustrates a portion of a primary node transmitter DSP in greater detail consistent with an aspect of the present disclosure.

Selected frequency bins FB are shown in FIG. 10*b*. Groups of such frequency bins FB are associated with give subcarriers. Accordingly, for example, a first group of frequency bins, FB0-0 to FB0-*n*, is associated with SC0 and a second group of frequency bins FB19-0 to FB19-*n* with SC19 (where n is a positive integer). As further shown in FIG. 10*b*, each of frequency bins FB is further coupled to a respective one of switches SW. For example, each of frequency bins FB0-0 to FB0-*n* is coupled to a respective one of switches SW0-0 to SW0-*n*, and each of FB19-0 to FB19-*n* is coupled to a respective one of switches or switch circuits SW19-0 to SW19-*n*.

Each switch SW selectively supplies either frequency domain data output from one of FFT circuits 1006-0 to 1006-19 or a predetermined value, such as 0. In order to block or eliminate transmission of a particular subcarrier, the switches SW associated with the group of frequency bins FB associated with that subcarrier are configured to supply the zero value to corresponding frequency bins. Accordingly, for example, in order to block subcarrier SC0, switches SW0-0' to SW0-n' supply zero (0) values to a respective one of frequency bins FB0-0 to FB0-n. Further processing, as described below, of the zero (0) values by replicator components 1007 as well as other components and circuits in DSP 902 result in drive signals supplied to modulators 910, such that subcarrier SC0 is omitted from the optical output from the modulators.

On the other hand, switches SW may be configured to supply the outputs of FFTs 1006, i.e., frequency domain data FD, to corresponding frequency bins FB. Further processing of the contents of frequency bins FB by replicator components 1007 and other circuits in DSP 902 result in drive signals supplied to modulators 910, whereby, based on such drive signals, optical subcarriers are generated that correspond to the frequency bin groupings associated with that subcarrier.

In the example discussed above, switches SW0-0' to SW0-n' supply frequency domain data FD0-0 to FD-n from FFT 1006-0 to a respective one of switches SW0-0 to SW0-n. These switches, in turn, supply the frequency domain data to a respective one of frequency bins FB0-0 to FB0-n for further processing, as described in greater detail below.

Each of replicator components or circuits 1007-0 to 1007-19 may replicate the contents of the frequency bins FB and store such contents (e.g., for T/2 based filtering of the subcarrier) in a respective one of the plurality of replicator components. Such replication may increase the sample rate. In addition, replicator components or circuits 1007-0 to 1007-19 may arrange or align the contents of the frequency bins to fall within the bandwidths associated with pulse shaped filter circuits 1008-0 to 1008-19 described below.

Each of pulse shape filter circuits 1008-0 to 1008-19 may apply a pulse shaping filter to the data stored in the 512 frequency bins of a respective one of the plurality of replicator components or circuits 1007-0 to 1007-19 to thereby provide a respective one of a plurality of filtered outputs, which are multiplexed and subject to an inverse FFT, as described below. Pulse shape filter circuits 1008-1 to 1008-19 calculate the transitions between the symbols and the desired subcarrier spectrum so that the subcarriers can be packed together spectrally for transmission, e.g., with a close frequency separation. Pulse shape filter circuits 1008-0 to 1008-19 also may be used to introduce timing skew between the subcarriers to correct for timing skew induced by links between nodes shown in FIG. 1, for example. Multiplexer component 1009, which may include a multiplexer circuit or memory, may receive the filtered outputs from pulse shape filter circuits 1008-0 to 1008-19, and multiplex or combine such outputs together to form an element vector.

Next, IFFT circuit or component 1010-1 may receive the element vector and provide a corresponding time domain signal or data based on an inverse fast Fourier transform (IFFT). In one example, the time domain signal may have a rate of 64 GSample/s. Take last buffer or memory circuit 1011-1, for example, may select the last 1024 samples, or another number of samples, from an output of IFFT component or circuit 1010-1 and supply the samples to DACs 904-1 and 904-2 (see FIG. 9) at 64 GSample/s, for example. As noted above, DAC 904-1 is associated with the in-phase (I) component of the X pol signal, and DAC 904-2 is associated with the quadrature (Q) component of the Y pol signal. Accordingly, consistent with the complex representation XI+jXQ, DAC 904-1 receives values associated with XI and DAC 904-2 receives values associated with jXQ. As indicated by FIG. 9, based on these inputs, DACs 904-1 and 904-2 provide analog outputs to MZMD 906-1 and MZMD 906-2, respectively, as discussed above.

As further shown in FIG. 10a, each of bits-to-symbol circuits 1004-0 to 1004-19 outputs a corresponding one of symbols indicative of data carried by the Y polarization component of the polarization multiplexed modulated optical signal output on fiber 916. As further noted above, these symbols may have the complex representation YI+j*YQ. Each such symbol may be processed by a respective one of overlap and save buffers 1015-0 to 1015-19, a respective one of FFT circuits 1016-0 to 1016-19, a respective one of replicator components or circuits 1017-0 to 517-19, pulse shape filter circuits 1018-0 to 1018-19, multiplexer or memory 1019, IFFT 1010-2, and take last buffer or memory circuit 1011-2, to provide processed symbols having the representation YI+j*YQ in a manner similar to or the same as that discussed above in generating processed symbols XI+j*XQ output from take last circuit 1011-1. In addition, symbol components YI and YQ are provided to DACs 904-3 and 904-4 (FIG. 9), respectively. Based on these inputs, DACs 904-3 and 904-4 provide analog outputs to MZMD 906-3 and MZMD 906-4, respectively, as discussed above.

While FIG. 10a shows DSP 902 as including a particular number and arrangement of functional components, in some implementations, DSP 902 may include additional functional components, fewer functional components, different functional components, or differently arranged functional components. In addition, typically the number of overlap and save buffers, FFTs, replicator circuits, and pulse shape filters associated with the X component may be equal to the number of switch outputs, and the number of such circuits associated with the Y component may also be equal to the number of switch outputs. However, in other examples, the number of switch outputs may be different from the number of these circuits.

As noted above, based on the outputs of MZMDs 906-1 to 906-4, a plurality of optical subcarriers SC0 to SC19 may be output onto optical fiber 916 (FIG. 9), which is coupled to the primary node 110.

Consistent with an aspect of the present disclosure, the number of subcarriers transmitted from primary node 110 to secondary nodes 112 may vary over time based, for example, on capacity requirements at the primary node and the secondary nodes. For example, if less downstream capacity is required initially at one or more of the secondary nodes, transmitter 202 in primary node 110 may be configured to output fewer optical subcarriers. On the other hand, if further capacity is required later, transmitter 202 may provide more optical subcarriers.

In addition, if based on changing capacity requirements, a particular secondary node 112 needs to be adjusted, for example, the output capacity of such secondary node may be increased or decreased by, in a corresponding manner, increasing or decreasing the number of optical subcarriers output from the secondary node.

As noted above, by storing and subsequently processing zeros (0s) or other predetermined values in frequency bin FB groupings associated with a given subcarrier SC, that subcarrier may be removed or eliminated. To add or reinstate such subcarrier, frequency domain data output from the FFTs 1006 may be stored in frequency bins FB and subsequently processed to provide the corresponding subcarrier. Thus, subcarriers may be selectively added or removed from the optical outputs of primary node transmitter 202 and secondary node transmitter 304, such that the number of subcarriers output from such transmitters may be varied, as desired.

In the above example, zeros (0s) or other predetermined values are stored in selected frequency bins FBs to prevent transmission of a particular subcarrier SC. Such zeroes or values may, instead, be provided, for example, in a manner similar to that described above, at the outputs of corresponding replicator components 1007 or stored in corresponding locations in memory or multiplexer 1009. Alternatively, the zeroes or values noted above may be provided, for example, in a manner similar to that described above, at corresponding outputs of pulse shape filters 1008.

In a further example, a corresponding one of pulse shape filters 1008-1 to 1008-19 may selectively generate zeroes or predetermined values that, when further processed, also cause one or more subcarriers SC to be omitted from the output of either primary node transmitter 202 or secondary node transmitter 304. In particular, as shown in FIG. 10c, pulse shape filters 1008-0 to 1008-19 are shown as including groups of multiplier circuits M0-0 to M0-n ... M19-0 to M19-n (also individually or collectively referred to as M). Each multiplier circuit M constitutes part of a corresponding butterfly filter. In addition, each multiplier circuit grouping is associated with a corresponding one of subcarriers SC.

Each multiplier circuit M receives a corresponding one of output groupings RD0-0 to RD0-n ... RD19-0 to RD19-n from replicator components 1007. In order to remove or eliminate one of subcarriers SC, multiplier circuits M receiving the outputs within a particular grouping associated with that subcarrier multiply such outputs by zero (0), such that each multiplier M within that group generates a product equal to zero (0). The zero products then are subject to further processing similar to that described above to provide drive signals to modulators 910 that result in a corresponding subcarrier SC being omitted from the output of the transmitter (either transmitter 202 or 304).

On the other hand, in order to provide a subcarrier SC, each of the multiplier circuits M within a particular groping may multiply a corresponding one of replicator outputs RD by a respective one of coefficients C0-0 to C0-n ... C19-0 to C19-n, which results in at least some non-zero products being output. Based on the products output from the corresponding multiplier grouping, drive signals are provided to modulators 910 to output the desired subcarrier SC from the transmitter (either transmitter 202 or 304).

Accordingly, for example, in order to block or eliminate subcarrier SC0, each of multiplier circuits M0-0 to M0-n (associated with subcarrier SC0) multiplies a respective one of replicator outputs RD0-0 to RD0-n by zero (0). Each such multiplier circuit, therefore, provides a product equal to zero, which is further processed, as noted above, such that resulting drive signals cause modulators 910 to provide an optical output without SC0. In order to reinstate SC0, multiplier circuits M0-0 to M0-n multiply a corresponding one of appropriate coefficients C0-0 to C0-n by a respective one of replicator outputs RD0-0 to RD0-n to provide products, at least some of which are non-zero. Based on these products, as noted above, modulator drive signals are generated that result in subcarrier SC0 being output.

The above examples are described in connection with generating or removing the X component of a subcarrier SC. The processes and circuitry described above is employed or included in DSP 902 and optical circuitry used to generate the Y component of the subcarrier to be blocked. For example, switches and bins circuit blocks 1022-0 to 1022-19, have a similar structure and operate in a similar manner as switches and bins circuit blocks 1021 described above to provide zeroes or frequency domain data as the case may be to selectively block the Y component of one or more subcarriers SC. Alternatively, multiplier circuits, like those described above in connection with FIG. 10c may be provided to supply zero products output from selected pulse shape filters 1018 in order to block the Y component of a particular subcarrier or, if non-zero coefficients are provided to the multiplier circuits instead, generate the subcarrier.

Thus, the above examples illustrate mechanisms by which subcarriers SC may be selectively blocked from or added to the output of transmitter 202. Since, as discussed below, DSPs and optical circuitry provided in secondary node transmitters 304 are similar to that of primary node transmitter 202, the processes and circuitry described above is provided, for example, in the secondary node transmitters 304 to selectively add and remove subcarriers SC' from the outputs of the secondary node transmitters, as described in connection with FIGS. 13b-13k. Moreover, consistent with the present disclosure, the circuitry described above in connection with FIGS. 10b and/or 10c maybe configured so that a first number of optical subcarriers are output from the transmitter (in either the primary node 110 or the secondary node 112) during a first period of time based on initial capacity requirements. Later, during a second period of time, a second number of optical subcarriers can be output from the hub and/or leaf transmitters based on capacity requirements different than the first capacity requirements.

Optical subcarriers SC0 to SC19 may be provided to secondary nodes 112 in FIG. 1. An example of receiver circuit 302 in one of secondary nodes 112 will be described next with reference to FIG. 11a.

Figure 11B:
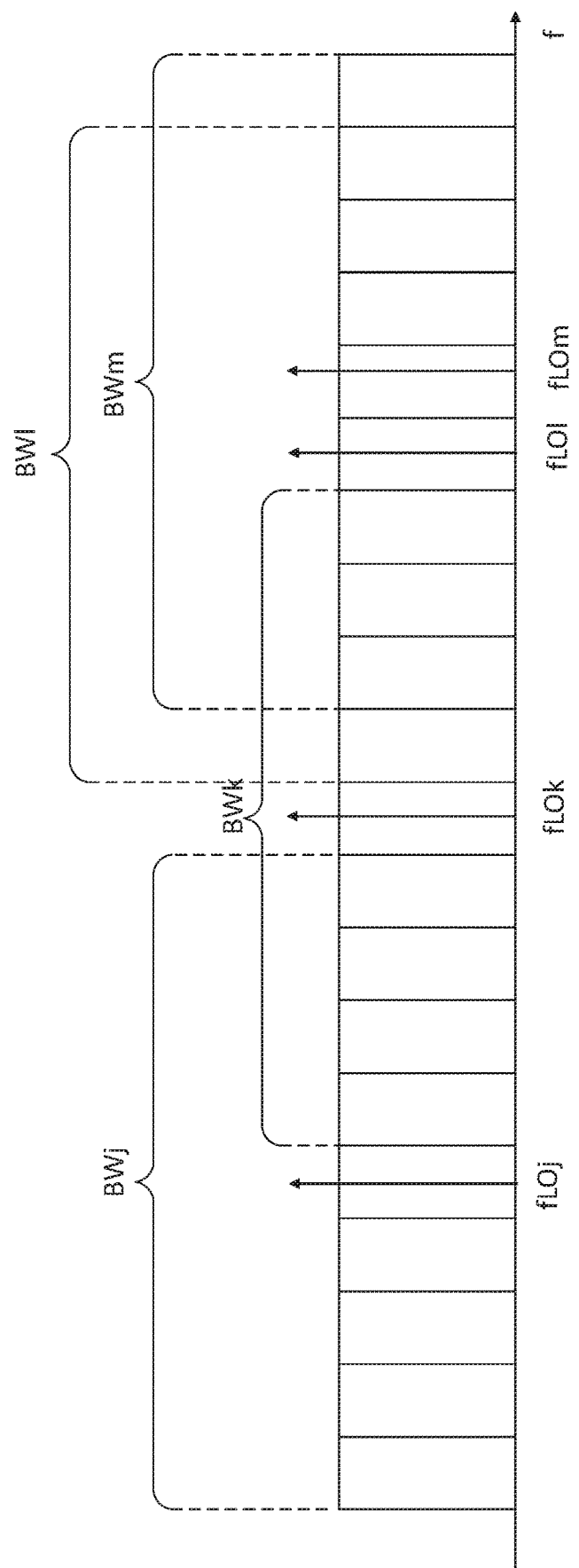

As shown in FIG. 11a, optical receiver 302 may include an Rx optics and A/D block 1100, which, in conjunction with DSP 1150, may carry out coherent detection. Block 1100 may include a polarization splitter (PBS) 1105 with first (1105-1) and second (1105-2) outputs), a local oscillator (LO) laser 1110, 90 degree optical hybrids or mixers 1120-1 and 1120-2 (referred to generally as hybrid mixers 1120 and individually as hybrid mixer 1120), detectors 1130-1 and 1130-2 (referred to generally as detectors 1130 and individually as detector 1130, each including either a single photodiode or balanced photodiode), AC coupling capacitors 1132-1 and 1132-2, transimpedance amplifiers/automatic gain control circuits TIA/AGC 1134-1 and 1134-2, ADCs 1140-1 and 1140-2 (referred to generally as ADCs 1140 and individually as ADC 1140).

Polarization beam splitter (PBS) 1105 may include a polarization splitter that receives an input polarization multiplexed optical signal including optical subcarriers SC0 to SC19 supplied by optical fiber link 1101, which may be, for example, an optical fiber segment as part of one of optical communication paths 113-k to 113-m noted above. PBS 1105 may split the incoming optical signal into the two X and Y orthogonal polarization components. The Y component may be supplied to a polarization rotator 1106 that rotates the polarization of the Y component to have the X polarization. Hybrid mixers 1120 may combine the X and rotated Y polarization components with light from local oscillator laser 1110, which, in one example, is a tunable laser. For example, hybrid mixer 1120-1 may combine a first polarization signal (e.g., the component of the incoming optical signal having a first or X (TE) polarization output from a first PBS port with light from local oscillator 1110, and hybrid mixer 1120-2 may combine the rotated polarization signal (e.g., the component of the incoming optical signal having a second or Y (TM) polarization output from a second PBS port) with the light from local oscillator 1110. In one example, polarization rotator 1190 may be provided at the PBS output to rotate Y component polarization to have the X polarization.

Detectors 1130 may detect mixing products output from the optical hybrids, to form corresponding voltage signals, which are subject to AC coupling by capacitors 1132-1 and 1132-1, as well as amplification and gain control by TIA/AGCs 1134-1 and 1134-2. The outputs of TIA/AGCs 1134-1 and 1134-2 and ADCs 1140 may convert the voltage signals to digital samples. For example, two detectors (e.g., photodiodes) 1130-1 may detect the X polarization signals to form the corresponding voltage signals, and a corresponding two ADCs 1140-1 may convert the voltage signals to digital samples for the first polarization signals after amplification, gain control and AC coupling. Similarly, two detectors 1130-2 may detect the rotated Y polarization signals to form the corresponding voltage signals, and a corresponding two ADCs 1140-2 may convert the voltage signals to digital samples for the second polarization signals after amplification, gain control and AC coupling. RX DSP 1150 may process the digital samples associated with the X and Y polarization components to output data associated with one or more subcarriers within a group of subcarriers SC0 to SC19 encompassed by the bandwidth (one of bandwidths BW, BWk, BWl, and BWm) associated with the secondary node housing the particular DSP 1150. For example, as shown in FIG. 6, subcarriers SC0 to SC8 are within bandwidth BSj, and such subcarriers may be processed by the receiver in secondary node 112-$j$. As noted above, however, subcarriers SC5 to SC13 are within bandwidth BWk may be processed by the receiver in secondary node 112-$k$. That is, bandwidths BWj and BWk overlap, such that subcarriers within the overlapped portions of these bandwidths, namely, subcarriers SC5 to SC8, will be processed by the receivers in both secondary node 112-$j$ and 112-$k$. If the data associated with these subcarriers is intended to be output from secondary node 112-$k$, switch circuits, for example, may be provided to selectively output such day at node 112-$k$ but not from node 112-$j$, as discussed in greater detail below.

While FIG. 11$a$ shows optical receiver 302 as including a particular number and arrangement of components, in some implementations, optical receiver 302 may include additional components, fewer components, different components, or differently arranged components. The number of detectors 1130 and/or ADCs 1140 may be selected to implement an optical receiver 302 that is capable of receiving a polarization multiplexed signal. In some instances, one of the components illustrated in FIG. 11$a$ may carry out a function described herein as being carry out by another one of the components illustrated in FIG. 11$a$.

Consistent with the present disclosure, in order to select a particular subcarrier or group of subcarriers at a secondary node 112, local oscillator 1110 may be tuned to output light having a wavelength or frequency relatively close to the selected subcarrier wavelength(s) to thereby cause a beating between the local oscillator light and the selected subcarrier(s). Such beating will either not occur or will be significantly attenuated for the other non-selected subcarriers so that data carried by the selected subcarrier(s) is detected and processed by DSP 1150.

As noted above, each secondary node 112 may have a smaller bandwidth than the bandwidth associated with primary node 110. The subcarriers encompassed by each secondary node may be determined by the frequency of the local oscillator laser 1110 in the secondary node receiver 302. For example, as shown in FIG. 11$b$, bandwidth BWj associated with secondary node 112-$j$ may be centered about local oscillator frequency fLOj, bandwidth BWk associated with secondary node 112-$k$ may be centered about local oscillator frequency fLOk, bandwidth BWl associated with secondary node 112-$l$ may be centered about local oscillator frequency fLOl, and bandwidth BWm associated with secondary node 112-$m$ may be centered about local oscillator frequency fLOm. Accordingly, each bandwidth BWj to BWm may shift depending on the frequency of each secondary node local oscillator laser 1110. Tuning the local oscillator frequency, for example, by changing the temperature of the local oscillator laser 1110 may result in corresponding shifts in the bandwidth to encompass a different group of subcarriers than were detected prior to such bandwidth shift. The temperature of the local oscillator laser 1110 may be controlled with a thin film heater, for example, provided adjacent the local oscillator laser or to portions of the local oscillator laser such as the mirror sections. Alternatively, the local oscillator laser may be frequency tuned by controlling the current supplied to the laser. The local oscillator laser 1110 may be a semiconductor laser, such as a distributed feedback laser or a distributed Bragg reflector laser.

The maximum bandwidth or number of subcarriers that may be received, detected, and processed by a secondary node receiver 302, however, may be restricted based on hardware limitations of the various circuit components in receiver 302, as noted above, and, therefore, may be fixed, in this example. Accordingly, as noted above, the bandwidth associated with each secondary node 112 may be less than bandwidth BW-P associated with primary node 110. Further, consistent with the present disclosure, the number of secondary nodes may be greater than the number of subcarriers output from primary node 110. In addition, the number of upstream subcarriers received by primary node 110 may be equal to the number of subcarriers transmitted by primary node 110 in the upstream direction. Alternatively, the number of subcarriers transmitted in the upstream direction collectively by secondary nodes 112 may less than or greater than the number of downstream subcarriers output from the primary node. Further, in another example, one or more of secondary nodes 112 may output a singe subcarrier.

As shown in FIG. 11$b$ and discussed above, the bandwidths associated with secondary nodes 112 may overlap, such that, as further noted above, certain subcarriers SC may be detected by multiple secondary nodes 112. If the data associated with such subcarriers SC is intended for one of those secondary nodes, but not the other, switch circuitry, as noted above, may be provided in the secondary nodes to output the data selectively at the intended secondary node but not the others.

For example, as further shown in FIG. 11$a$, switches or circuits SW-0 to SW-8 may be provided at the output of DSP 1150 to selectively output the data detected from the received subcarriers based on a respective one of control signals CNT-0 to CNT-8 output from control circuit 1171, which, like control circuit 971 noted above may include a microprocessor, FPGA, or other processor circuit. Control signals may designate the output of each respective switch. Accordingly, for example, if data carried by predetermined subcarriers is intended to be output at a particular secondary node 112, switches SW at that secondary node may be configured, based on the received control signals CNT, to supply the desired data, but block data not intended for that node.

Figure 12:
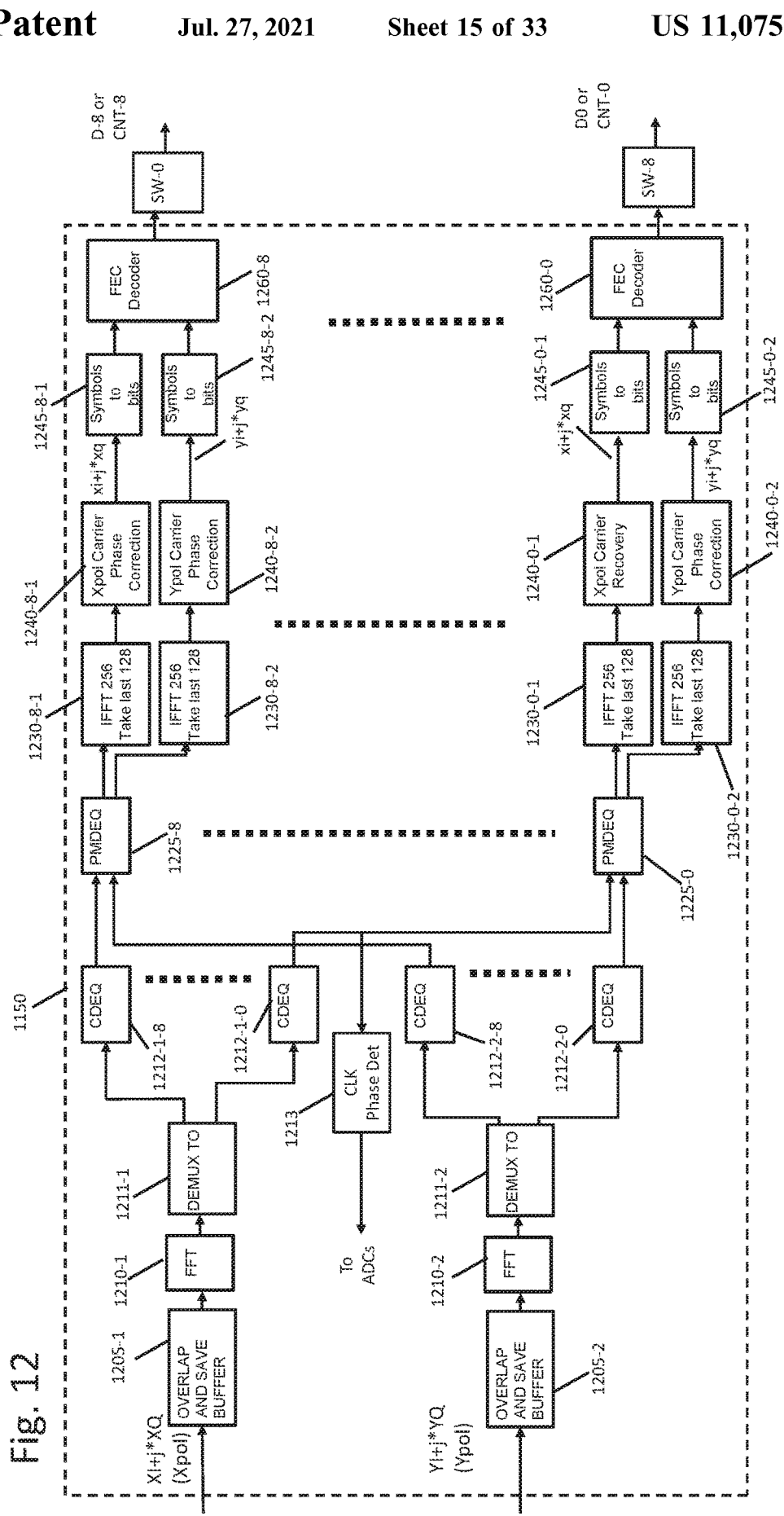
FIG. 12 shows an example of a secondary node receiver DSP consistent with the present disclosure.

FIG. 12 illustrates exemplary components of receiver digital signal processor (DSP) 1150. As noted above, analogto-digital (A/D) circuits 1140-1 and 1140-2 (FIG. 11*a*) output digital samples corresponding to the analog inputs supplied thereto. In one example, the samples may be supplied by each A/D circuit at a rate of 64 GSamples/s. The digital samples correspond to symbols carried by the X polarization of the optical subcarriers and may be represented by the complex number XI+jXQ. The digital samples may be provided to overlap and save buffer 1205-1, as shown in FIG. 12. FFT component or circuit 1210-1 may receive the 2048 vector elements, for example, from the overlap and save buffer 1205-1 and convert the vector elements to the frequency domain using, for example, a fast Fourier transform (FFT). The FFT component 1210-1 may convert the 2048 vector elements to 2048 frequency components, each of which may be stored in a register or "bin" or other memory, as a result of carrying out the FFT.

The frequency components then may be demultiplexed by demultiplexer 1211-1, and groups of such components may be supplied to a respective one of chromatic dispersion equalizer circuits CDEQ 1212-1-0 to 1212-1-8, each of which may include a finite impulse response (FIR) filter that corrects, offsets or reduces the effects of, or errors associated with, chromatic dispersion of the transmitted optical subcarriers. Each of CDEQ circuits 1212-1-0 to 1212-1-8 supplies an output to a corresponding polarization mode dispersion (PMD) equalizer circuit 1225-0 to 1225-8 (which individually or collectively may be referred to as 1225).

Digital samples output from A/D circuits 640-2 associated with Y polarization components of subcarrier SC1 may be processed in a similar manner to that of digital samples output from A/D circuits 1240-1 and associated with the X polarization component of each subcarrier. Namely, overlap and save buffer 1205-2, FFT 1210-2, demultiplexer 1211-2, and CDEQ circuits 1212-2-0 to 1212-2-8 may have a similar structure and operate in a similar fashion as buffer 1205-1, FFT 1210-1, demultiplexer 122-1, and CDEQ circuits 1212-1-0 to 1212-1-8, respectively. For example, each of CDEQ circuits 1212-2-0 to 1212-2-8 may include an FIR filter that corrects, offsets, or reduces the effects of, or errors associated with, chromatic dispersion of the transmitted optical subcarriers. In addition, each of CDEQ circuits 1212-2-0 to 1212-2-8 provide an output to a corresponding one of PMDEQ 1225-0 to 1225-8.

As further shown in FIG. 12, the output of one of the CDEQ circuits, such as CDEQ 1212-1-0 ma be supplied to clock phase detector circuit 1213 to determine a clock phase or clock timing associated with the received subcarriers. Such phase or timing information or data may be supplied to ADCs 1140-1 and 1140-2 to adjust or control the timing of the digital samples output from ADCs 1140-1 and 1140-2.

Each of PMDEQ circuits 1225 may include another FIR filter that corrects, offsets or reduces the effects of, or errors associated with, PMD of the transmitted optical subcarriers. Each of PMDEQ circuits 1225 may supply a first output to a respective one of IFFT components or circuits 1230-0-1 to 1230-8-1 and a second output to a respective one of IFFT components or circuits 1230-0-2 to 1230-8-2, each of which may convert a 256-element vector, in this example, back to the time domain as 256 samples in accordance with, for example, an inverse fast Fourier transform (IFFT).

Time domain signals or data output from IFFT 1230-0-1 to 1230-8-1 are supplied to a corresponding one of Xpol carrier phase correction circuits 1240-1-1 to 1240-8-1, which may apply carrier recovery techniques to compensate for X polarization transmitter (e.g., laser 908) and receiver (e.g., local oscillator laser 1110) linewidths. In some implementations, each carrier phase correction circuit 1240-0-1 to 1240-8-1 may compensate or correct for frequency and/or phase differences between the X polarization of the transmit signal and the X polarization of light from the local oscillator 1100 based on an output of Xpol carrier recovery circuit 1240-0-1, which performs carrier recovery in connection with one of the subcarrier based on the outputs of IFFT 1230-01. After such X polarization carrier phase correction, the data associated with the X polarization component may be represented as symbols having the complex representation xi+j*xq in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1225 may be updated based on the output of at least one of carrier phase correction circuits 1240-0-1 to 1240-8-01.

In a similar manner, time domain signals or data output from IFFT 1230-0-2 to 1230-8-2 are supplied to a corresponding one of Ypol carrier phase correction circuits 1240-0-2 to 1240-8-2, which may compensate or correct for Y polarization transmitter (e.g., laser 908) and receiver (e.g., local oscillator laser 1110) linewidths. In some implementations, each carrier phase correction circuit 1240-0-2 to 1240-8-2 also may correct or compensate for frequency and/or phase differences between the Y polarization of the transmit signal and the Y polarization of light from the local oscillator 1110. After such Y polarization carrier phase correction, the data associated with the Y polarization component may be represented as symbols having the complex representation yi+j*yq in a constellation, such as a QPSK constellation or a constellation associated with another modulation formation, such as an m-quadrature amplitude modulation (QAM), m being an integer. In some implementations, the output of one of circuits 1240-0-2 to 1240-8-2 may be used to update the taps of the FIR filter included in one or more of PMDEQ circuits 1225 instead of, or in addition to, the output of at least one of the carrier recovery circuits 1240-0-1 to 1240-8-1.

As further shown in FIG. 12, the output of carrier recovery circuits, e.g., carrier recovery circuit 1240-0-1, also may be supplied to carrier phase correction circuits 1240-1-1 to 1240-8-1 and 1240-0-2 to 1240-8-2, whereby the phase correction circuits may determine or calculate a corrected carrier phase associated with each of the received subcarriers based on one of the recovered carriers, instead of providing multiple carrier recovery circuits, each of which is associated with a corresponding subcarrier. The equalizer, carrier recovery, and clock recovery may be further enhanced by utilizing the known (training) bits that may be included in control signals CNT, for example by providing an absolute phase reference between the transmitted and local oscillator lasers.

Each of the symbols-to-bits circuits or components 1245-0-1 to 1245-8-1 may receive the symbols output from a corresponding one of circuits 1240-0-1 to 1240-8-1 and map the symbols back to bits. For example, each of the symbol-to-bits components 1245-0-1 to 1245-8-1 may map one X polarization symbol, in a QPSK or m-QAM constellation, to Z bits, where Z is an integer. For dual-polarization QPSK modulated subcarriers, Z is four. Bits output from each of component 1245-0-1 to 1245-8-1 are provided to a corresponding one of FEC decoder circuits 1260-0 to 1260-8.

Y polarization symbols are output form a respective one of circuits 1240-0-2 to 1240-8-2, each of which has the complex representation yi+j*yq associated with data carried by the Y polarization component. Each Y polarization, like the X polarization symbols noted above, may be provided to a corresponding one of bit-to-symbol circuits or components 1245-0-2 to 1245-8-2, each of which has a similar structure and operates in a similar manner as symbols-to-bits component 1245-0-1 to 1245-8-1. Each of circuits 1245-0-2 to 1245-8-2 may provide an output to a corresponding one of FEC decoder circuits 1260-0 to 1260-8.

Each of FEC decoder circuits 1260 may remove errors in the outputs of symbol-to-bit circuits 1245 using, for example, forward error correction. Such error corrected bits, which may include user data for output from secondary node 112, may be supplied to a corresponding one of switch circuits SW-0 to SW-8. As noted above, switch circuits SW-0 to SW-8 in each secondary node 112 may selectively supply or block data based on whether such data is intended to be output from the secondary node. In addition, if one of the received subcarriers' control information (CNT), such as information identifying switches SW that output data and other switches SW that block data, the control information may be output from one of the switches and, based on such control information, control circuit 1171 in the secondary nodes to generate the control signals CNT.

Consistent with another aspect of the present disclosure, data may be blocked from output from DSP 1150 without the use of switches SW-0 to SW-8. In one example similar to an example described above, zero (0) or other predetermined values may be stored in frequency bins associated with the blocked data, as well as the subcarrier corresponding to the blocked data. Further processing described above of such zeroes or predetermined data by circuitry in DSP 1150 will result in null or zero data outputs, for example, from a corresponding one of FEC decoders 1260. Switch circuits provided at the outputs of FFTs 1210-1 and 1210-2, like switch circuits SW described above in FIG. 10b, may be provided to selectively insert zeroes or predetermined values for selectively blocking corresponding output data from DSP 1150. Such switches also may be provided at the output of or within demultiplexers 1211-1 and 1211-2 to selectively supply zero or predetermined values.

In another example, zeroes (0s) may be inserted in chromatic dispersion equalizer (CDEQ) circuits 1212 associated with both the X and Y polarization components of each subcarrier. In particular, multiplier circuits (provided in corresponding butterfly filter circuits), like multiplier circuits M described above, may selectively multiply the inputs to the CDEQ circuit 1212 by either zero or a desired coefficient. As discussed above in connection with FIG. 10c, multiplication by a zero generates a zero product. When such zero products are further processed by corresponding circuitry in DSP 1150, e.g., corresponding IFFTs 1230, carrier phase correction components 1240, symbol-to-bits components 1245, and FEC decoder, a corresponding output of DSP 1150 will also be zero. Accordingly, data associated with a subcarrier SC received by a secondary node receiver 112, but not intended for output from that receiver, can be blocked.

If, on the other hand, capacity requirements change and such previously blocked data is to be output from a given secondary node receiver DSP 1150, appropriately coefficients may be supplied to the multiplier circuits, such that at least some of the inputs thereto are not multiplied by zero. Upon further processing, as noted above, data associated with the inputs to the multiplier circuits and corresponding to a particular subcarrier SC is output from secondary node receiver DSP 1150.

While FIG. 12 shows DSP 1150 as including a particular number and arrangement of functional components, in some implementations, DSP 650 may include additional functional components, fewer functional components, different functional components, or differently arranged functional components.

Upstream transmission from a secondary node 112 to primary node 110 will be described next with reference to FIGS. 13a-13k and 14.

Figure 13A:
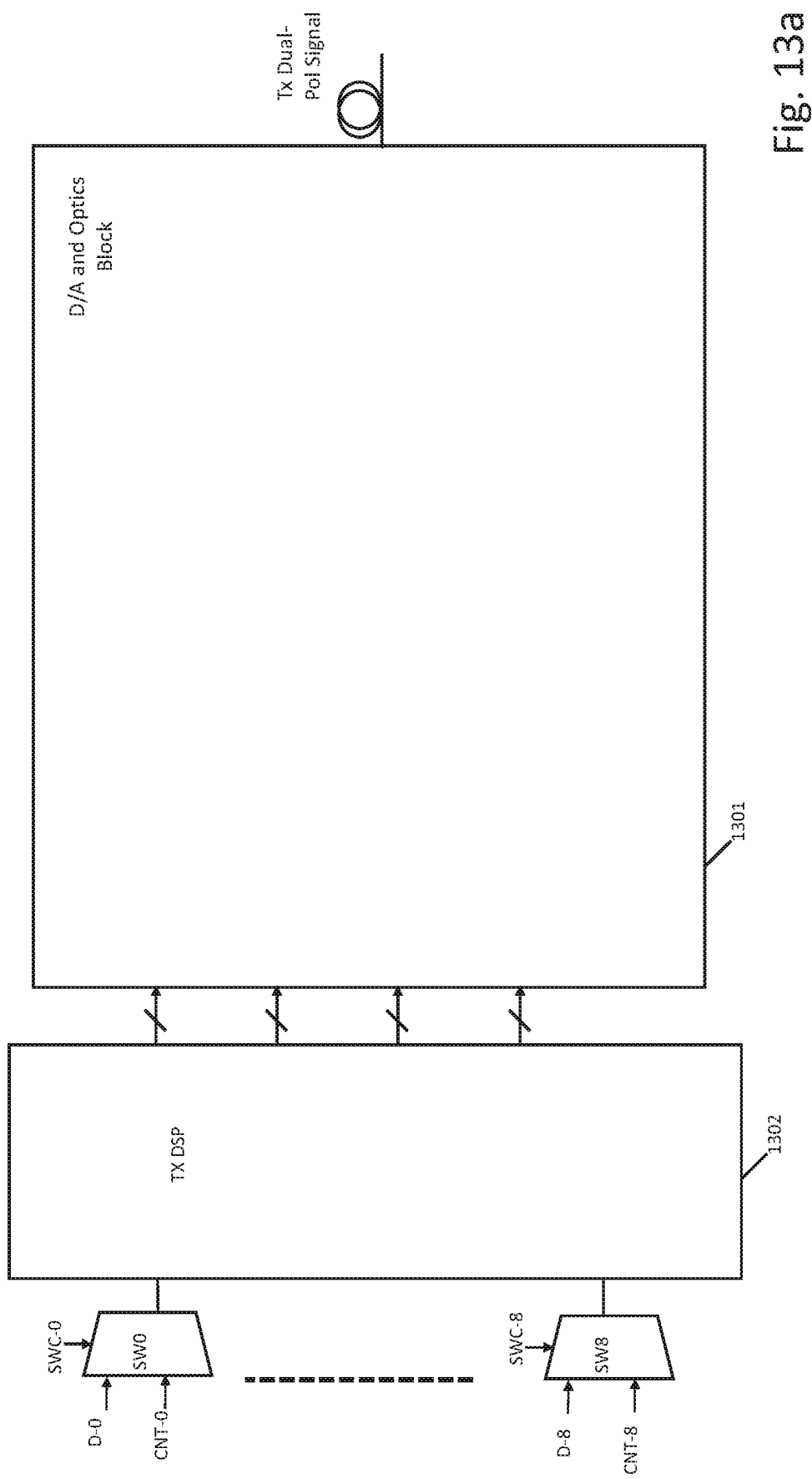
FIG. 13a shows an example of a secondary node transmitter consistent with an aspect of the present disclosure.

FIG. 13a shows an example of secondary node transmitter 304 in greater detail. Transmitter 304 includes a plurality of circuits or switches SW. In this example, nine switches (SW-0 to SW-8) are shown, although more or fewer switches may be provided than that shown in FIG. 13a. Each switch may have, in one example, two inputs: the first input may receive user data, and the second input may receive control information or signals (CNT). Each switch SW-0 to SW-8 further receives a respective one of control signals SWC-0 to SWC-8 output from a control circuit. Based on the received control signal, each switch SW-0 to SW8 selectively outputs one of a respective one of data streams D-0 to D-8, a respective on of control signals CNT-0 to CNT-8, to DSP 1302.

Alternatively, in a manner similar to that noted above, the transmitted subcarrier can be removed by inserting zero amplitude at the input or output of the FFT, or by programming zero coefficients into selected multiplier inputs of pulse shape filters 1008 and 1016, if a user desires that particular subcarrier is to be omitted such that fewer subcarriers are to be transmitted.

DSP 1302 may have a similar structure as DSP 902 described above with reference to FIGS. 9 and 10a. In some instances, however, DSP 1302 may have a lower capacity than DSP 902 and, therefore, the number of circuits, such as FEC encoders, bits-to-symbol mappers, overlap and save buffers, FFT circuits, replicator circuits, and pulse shape filters may be reduced, for example, in accordance with the number of inputs to DSP 1302. Accordingly, fewer subcarriers may be output from each of secondary nodes 112 compared to the number of subcarriers output from primary node 110.

Based on the outputs of switches SW-0 to SW-8, DSP 1302 may supply a plurality of outputs to D/A and optics block 1301, which may have a similar construction as D/A and optics block 901 described above to supply X and Y polarized optical signals, each including I and Q components, that are combined by a PBC and output onto an optical fiber segment 1316 included in one of optical communication paths 115 shown in FIG. 2.

Alternatively, based on zeroes (0s) stored or generated in DSP 1302, subcarriers may be blocked or added in a manner similar to that described above.

Figure 13F:
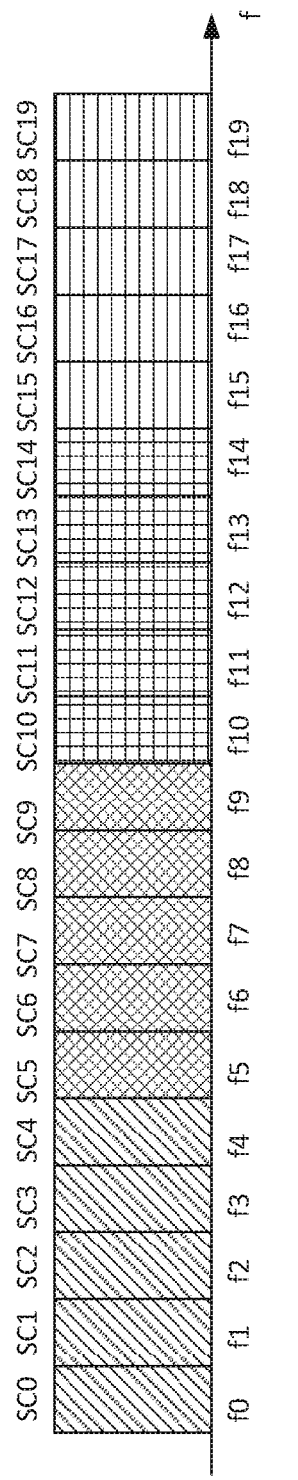

FIGS. 13b to 13e show examples of subcarriers (SC') output from each of secondary nodes 112-j to 112-m, respectively, in an upstream direction when, for example, subcarriers SC0-SC19 shown in FIG. 6 are transmitted in the downstream direction. Namely, FIG. 13b shows a first group of subcarriers SC0' to SC4' which may be output from secondary node 112-j; FIG. 13c shows a second group of subcarriers SC5' to SC9' which may be output from secondary node 112-k; FIG. 13d shows a third group of subcarriers SC10' to SC14' which may be output from secondary node 112-l; and FIG. 13e shows a fourth group of subcarriers SC15' to SC19' which may be output from secondary node 112-m. As shown in FIG. 2, each group subcarriers may be combined in combiner 116, for example and supplied over optical communication path 117 to a receiver (e.g., receiver 204 shown in FIG. 3) of primary node 110. FIG. 13f shows such combined optical subcarriers SC0' to SC19', each having a corresponding one of frequencies f0 to f19.

Figure 13K:
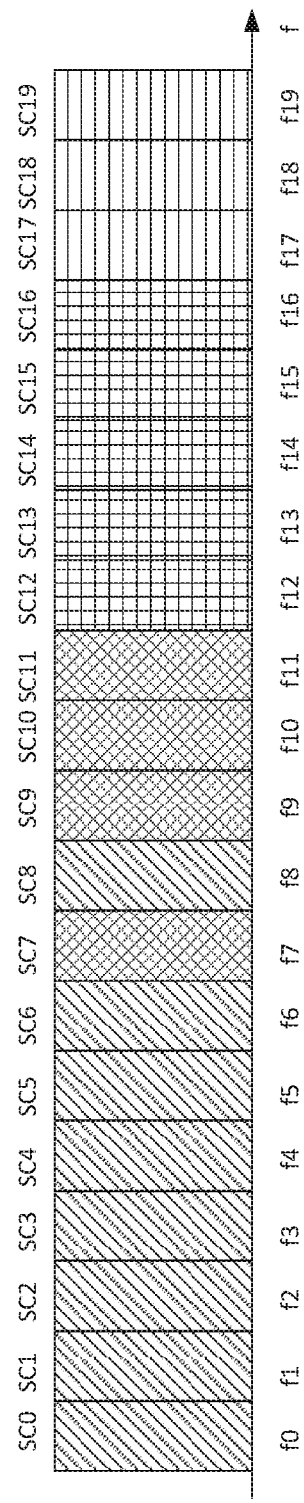
FIG. 13k is an example of a spectral plot showing combined subcarriers supplied to a primary node receiver.

FIGS. 13g to 13j show example of subcarriers (SC") output from each of secondary nodes 112-j to 112-m, respectively, in an upstream direction when, for example, subcarriers SC0-SC19 shown in FIG. 8 are transmitted in the downstream direction. In particular, FIG. 13g shows a first group of subcarriers SC0" to SC6" and SC8" which may be output from secondary node 112-j; FIG. 13h shows a second group of subcarriers SC7" and SC9"-SC11" which may be output from secondary node 112-k; FIG. 13i shows a third group of subcarriers SC12" to SC16" which may be output from secondary node 112-l; and FIG. 13j shows a fourth group of subcarriers SC17" to SC19" which may be output from secondary node 112-m. As noted, each group subcarriers output from the secondary nodes may be combined in combiner 116, for example and supplied over optical communication path 117 to receiver 204 in primary node 110. FIG. 13k shows such combined optical subcarriers SC0" to SC19", each having a corresponding one of frequencies f0 to f19.

Figure 14:
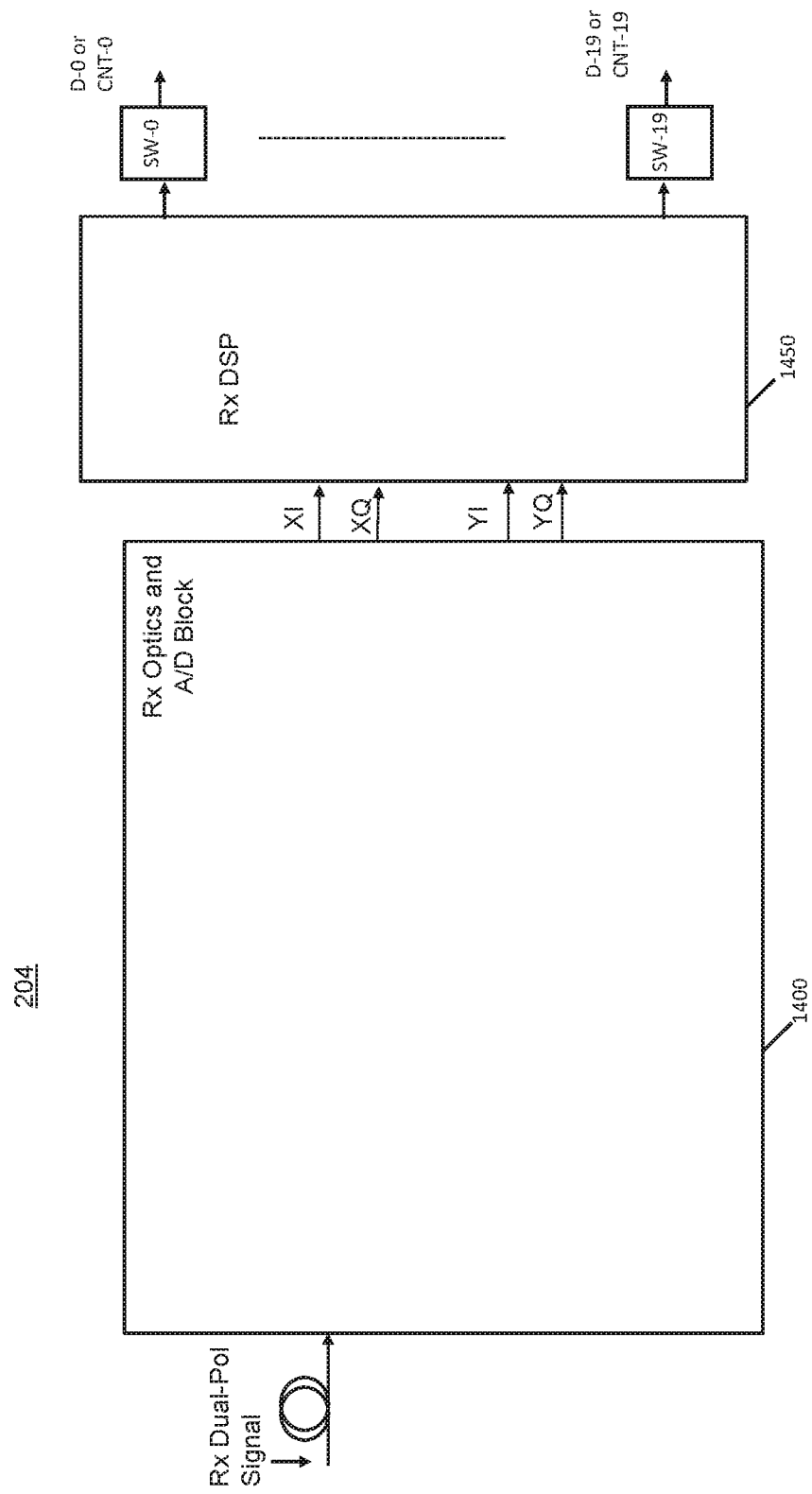
FIG. 14 shows an example of a primary node receiver in accordance with an aspect of the present disclosure.

FIG. 14 shows an example of primary node receiver 204 in greater detail. Primary node receiver 204 includes an Rx optics and A/D block 1400 having a similar construction as Rx optics and receiver block 1100 described above in connection with FIG. 11a. For example, block 1400 may include a polarization beam splitter that received an upstream polarization multiplexed optical signal including optical subcarriers SC0' to SC19' or SC0" to SC19" supplied by optical fiber link 1401, which may be, for example, an optical fiber segment as part of one of optical communication paths 115-k to 115-m noted above, a local oscillator laser, optical hybrids, photodiodes, capacitive coupler, TIA/AGC circuits and analog-to-digital (A/D) converter circuits similar to those discussed above and configured in a manner similar to that described above. Accordingly, block 1400 provides outputs XI, XQ, YI, and YQ similar to corresponding output supplied from block 1100. The bandwidth associated with each of the components and circuits in block 1400, however, may have a greater bandwidth than the corresponding components in secondary nodes 112, and, therefore, primary node receiver 204 may detect and process each of the subcarriers output from secondary nodes 112.

As further shown in FIG. 14, primary node receiver 204 also may include DSP 1450 that receives signals XI, XQ, YI, and YQ from block 1400. DSP 1450 may have a similar structure as DSP 1150 shown in FIG. 11a. DSP 1450, however, may have a higher capacity than DSP 1150 and, therefore, the number of circuits, such as FEC decoders, symbol to bit mappers, overlap and save buffers, CDEQ circuits, and PMDEQ circuits, may be greater than that shown in FIG. 11a in accordance with the number of outputs from DSP 1450.

The outputs from DSP 1450 next may be supplied to switches SW-0 to SW-19, which selectively output, under the control of control signals similar to those described above, one of: a corresponding one of data streams D-0 to D-19; and a corresponding one of control signals CNT-0 to CNT-19. The control information may include, for example, monitoring information associated with secondary nodes 112 or scheduling information, such as time of flight (TOF) or delta time TOF information as described below with reference to FIGS. 20-24.

Alternatively, based on zeros generated or stored in DSP 1450, data may be selectively be supplied from each DSP output in a manner similar to that described above.

Figure 15:
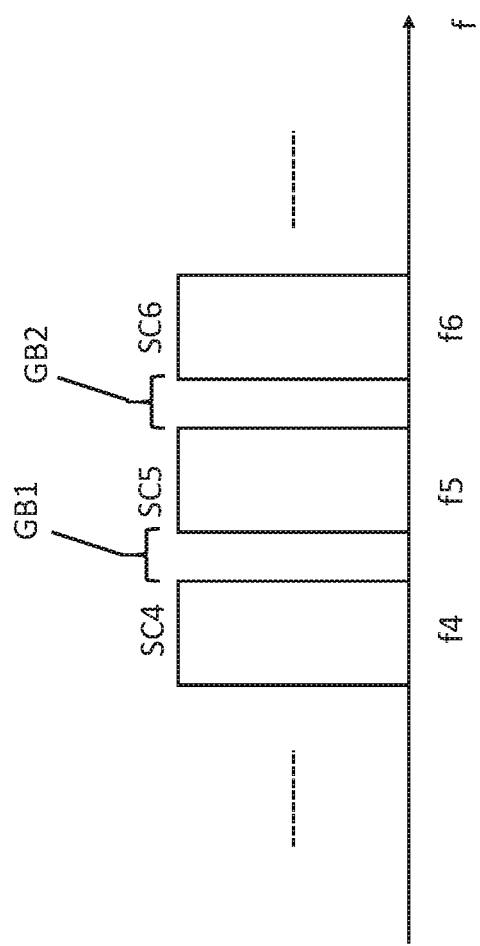
FIG. 15 shows an example of a guard band consistent with an additional aspect of the present disclosure.

In a further example consistent with the present disclosure, guard bands or frequency gaps may be provided between adjacent subcarriers SC. As shown in FIG. 15, guard band GB1 may be provided between subcarriers SC4 and SC5, and guard band GB2 may be provided between subcarriers SC5 and SC6. Additional guard bands may be provided between remaining adjacent pairs of subcarriers. Such guard bands may be provided in order to detect and process each subcarrier more accurately by reducing crosstalk or other interference between the subcarriers.

Figure 16:
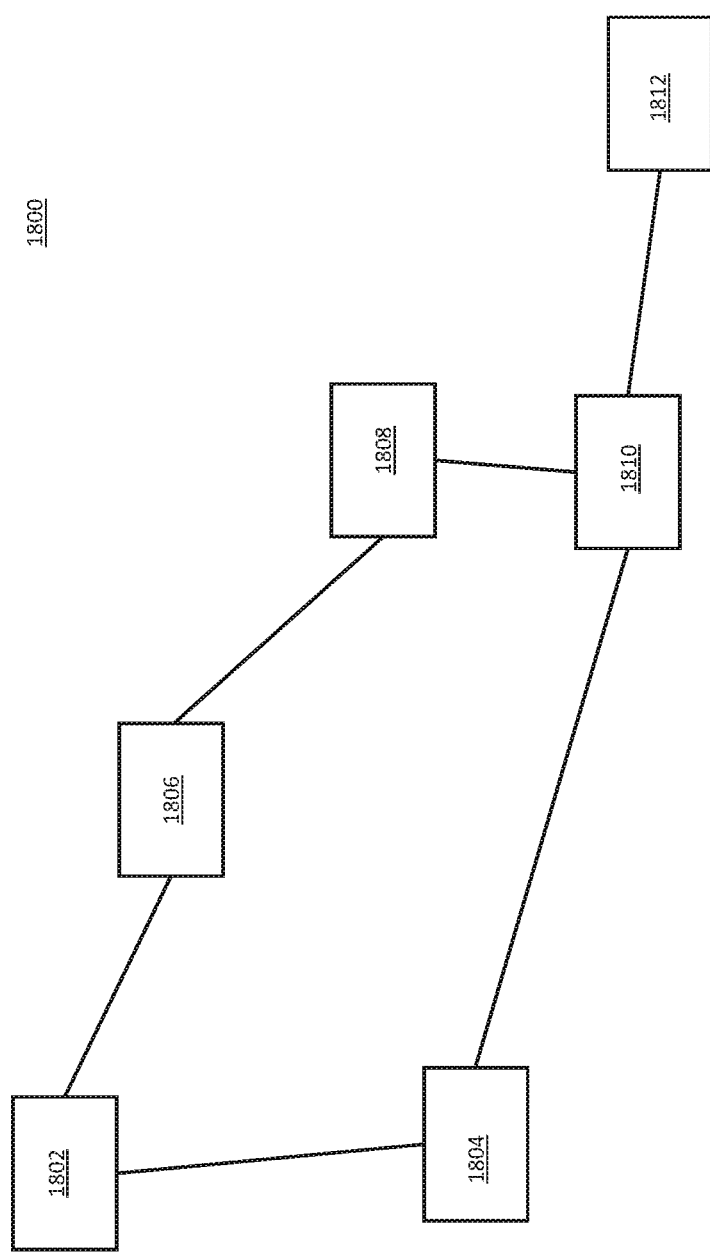
FIG. 16 shows an example of a mesh network configuration consistent with a further aspect of the present disclosure.

As noted above, network configurations other than the aggregation network configuration discussed above in connection with FIGS. 1 and 2 are contemplated here, such as a mesh network, an example of which (network 1800) is shown in FIG. 16. Network 1800 may include a plurality of nodes 1802, 1804, 1806, 1808, 1810, and 1812, which are connected to have multiple paths between one another. For example, node 1802 may communicate with node 1812 via a path including nodes 1806 and 1808 or a path including nodes 1804 and 1810. Nodes 1802, 1804, 1806, 1808, 1810, and 1812 may include at least one primary node, similar to node 110 and at least one secondary node 112 similar to those described above. Further, in a manner similar to that described above the amount of data or data rate of data output from each of the nodes shown in FIG. 16 may be controlled or dynamically adapted based on control information exchanged between each node.

Figure 17:
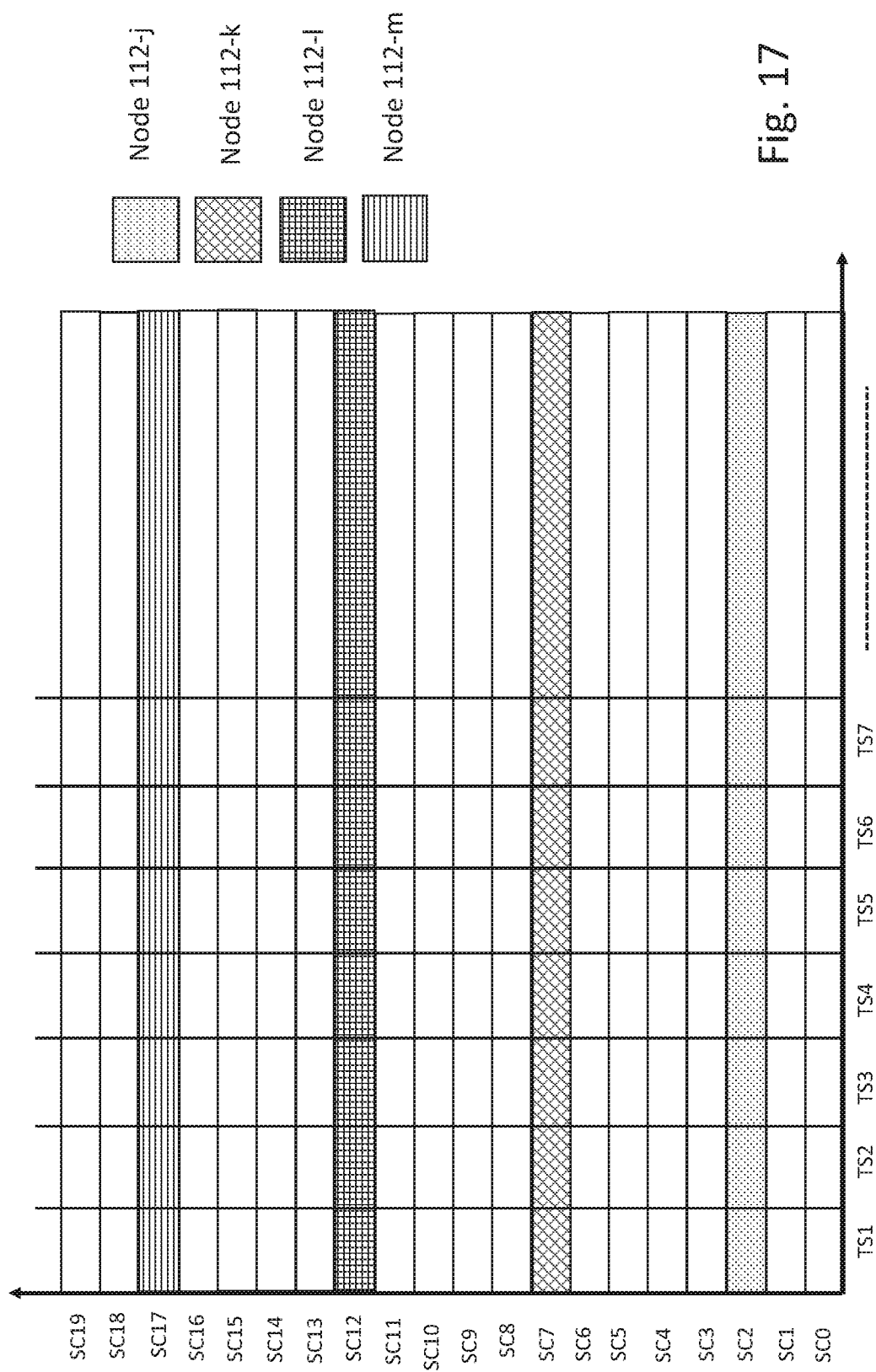
Figure 19:
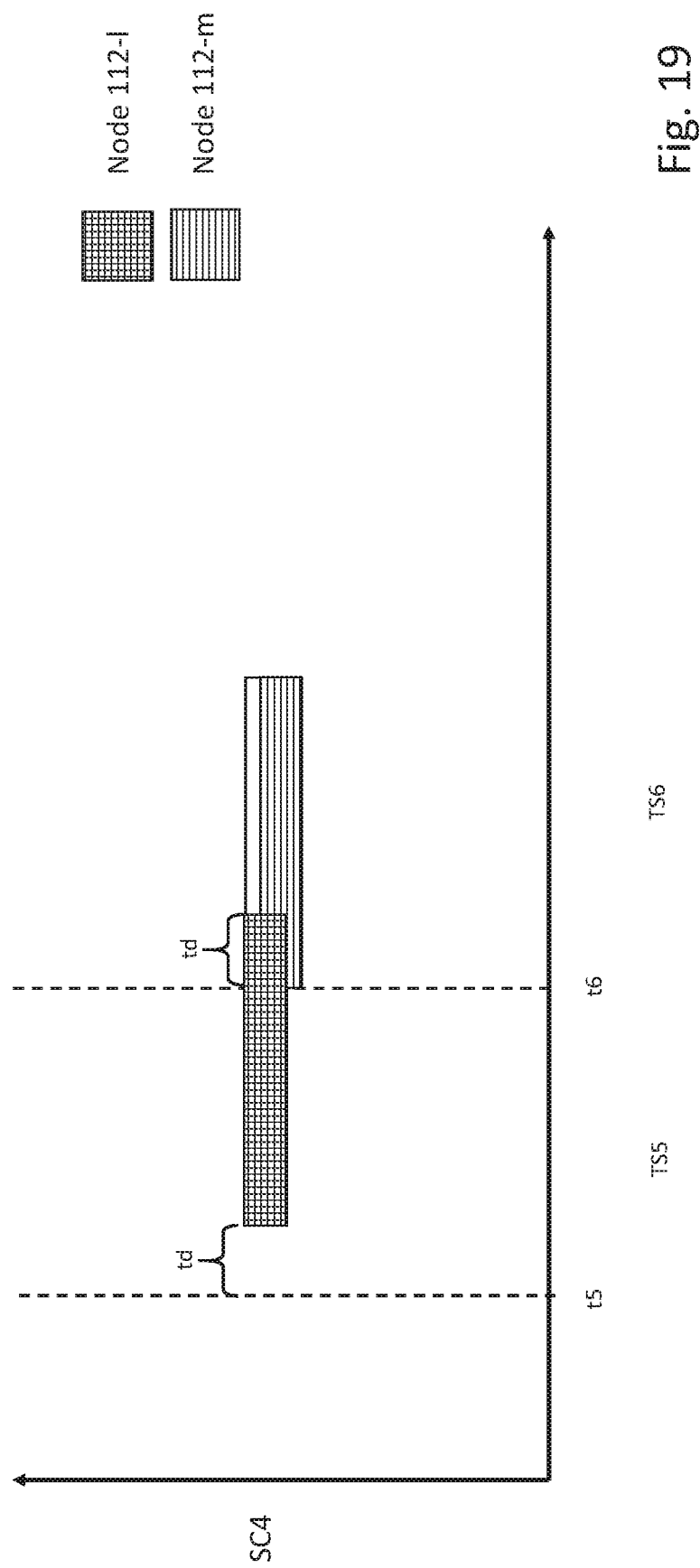

Allocation of data carried by subcarriers SC0 to SC19 and output from secondary nodes 112-j to 112-m, and examples of reallocation of such data output from the secondary nodes will next be described with reference to FIGS. 19 and 20a to 20c. FIG. 19 is a timing diagram showing transmission of control information on dedicated subcarriers SC2, SC7, SC12, and SC17, as further depicted in FIG. 4. As shown in the example depicted in FIG. 17, each of these subcarriers is continuously transmitted from primary node 110, while remaining subcarriers SC1, SC3-SC6, SC8-SC11, SC13-SC16, SC18, and SC19 are not transmitted. The control information carried by subcarriers SC2, SC7, SC12, and SC17 is associated with nodes 112-j, 112-k, 112-l, and 112-m, respectively. Moreover, subcarriers SC2, SC7, SC12, and SC17 can also carry user data associated with each such node, in another example.

FIG. 18a shows a timing diagram corresponding to the subcarrier transmission shown in FIG. 6. Here, data associated with node 112-j is continuously transmitted on subcarrier SC0 to SC4, data associated with node 112-k is continuously transmitted on subcarriers SC5 to SC9, data associated with node 112-l is continuously transmitted on subcarriers SC10 to SC14, and data associated with node 112-m is continuously transmitted on subcarriers SC15 to SC19.

Figure 18B:
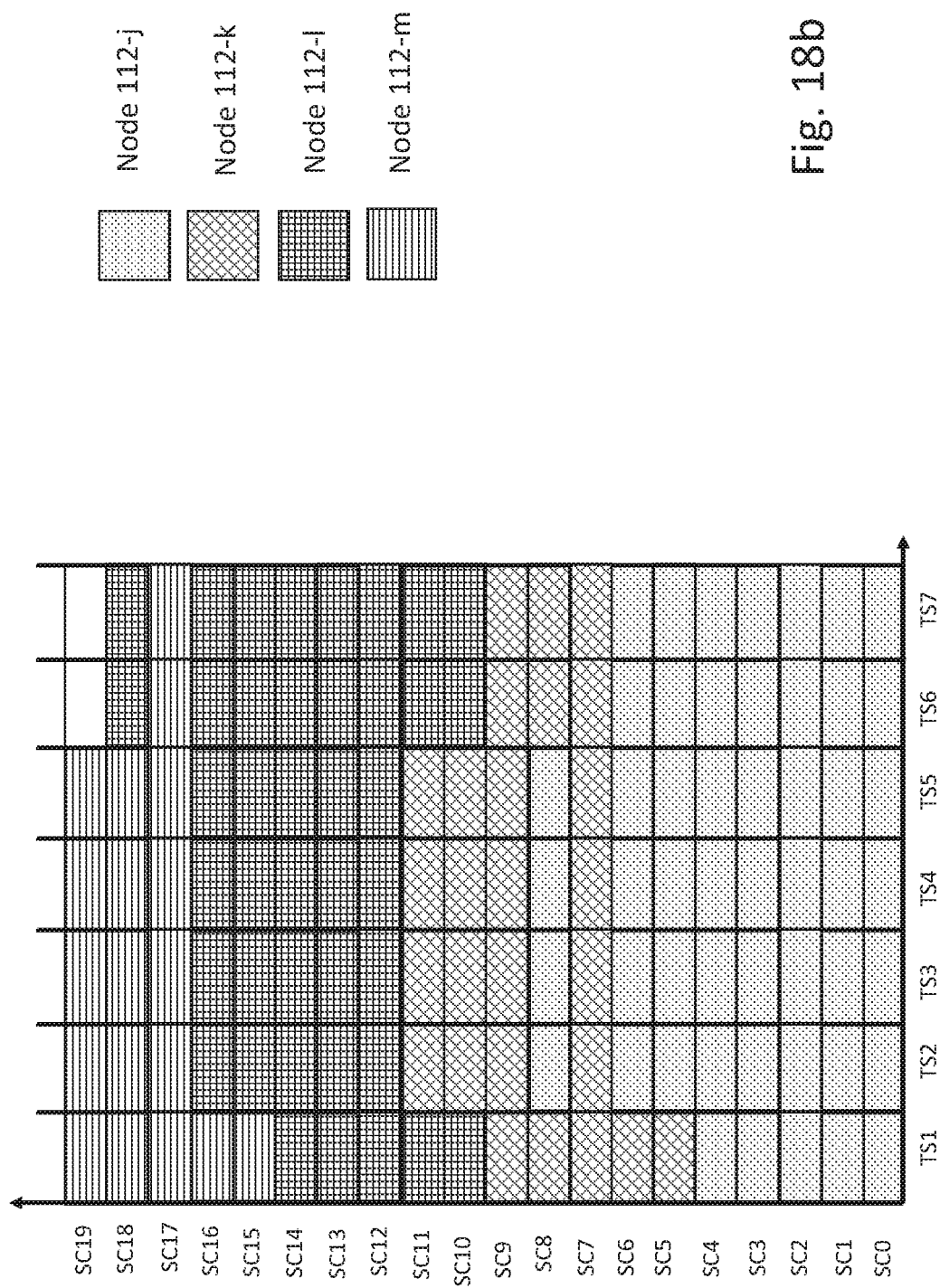

As noted above, data associated with secondary nodes 112 may be reallocated among subcarriers SC0 to SC19. Consistent with present disclosure, such reallocation may occur on a time slot-by-time slot basis. An example of such reallocation is shown in FIG. 18b. Namely, as shown in FIG. 18b, during time slot TS1 subcarrier SC8 carries data associated with node 112-k. During time slot TS2, however, subcarrier S8 carries data associated with node 112-j and continues to do so until time slot TS6. At which point subcarrier S8 carries data associated with node 112-k and does so through time slot S9, as well. In a similar fashion other time slots may be switched to carry data associated with different nodes, or, as further shown in FIG. 18b, subcarriers, such as subcarriers SC0 to SC4 may continues to carry data associated with just node 112-j. Such reallocation may be based on capacity requirements in the system. In addition, as noted above, the data associated with a particular secondary node 112 is that data which is output from the secondary node based on control information received by the second node and the configuration of the second node, as described above with reference to FIGS. 10b and 10c.

FIG. 18c shows a further example in which, in the absence of a particular capacity need during a given time slot, no data is transmitted. Namely, as shown in FIG. 18c, during time slot TS5 subcarriers SC11, SC8, and SC4 do not carry any. These subcarriers are blocked during time slot TS5 by circuitry described above with reference to FIGS. 10b and 10c.

The above examples describe reallocation of data to subcarriers transmitted in the downstream direction from primary node 110 to secondary nodes 112. In the upstream direction, as described above, one or more subcarriers may be transmitted from one or more secondary nodes 112 to primary node 110. If secondary nodes 112 are located at different distances away from primary node 110, the arrival time of data at primary node 110 from one secondary node 112 may be different than the arrival time of data from another secondary node 112. As a result, data input to the primary node 110 from secondary nodes 112 may not be synchronized, such that data launched on a given subcarrier from a first secondary node during one time slot may arrive while primary node 110 is receiving data from another secondary node, leading to errors or loss of data at primary node 110.

For example, with reference to FIG. 19, if node 112-l is farther away from primary node 110 than node 112-m, data output from node 112-l on subcarrier SC4, for example, will experience a delay, td. Such data will not arrive at primary node 110 until time t5+td, as shown in FIG. 19, and will continue to be received for the during of a time slot, i.e., until time t6+td. At time t6, however, primary node 110 may being to receive data from node 112-m, and due to the delay data transmission from node 112-l, primary node 110 will, in this example, receive data from both node 112-l and 112-m on subcarrier 4, such that neither data supplied from node 112-l nor data supplied from node 112-m may be reliably detected during the interval t6 to t6+td.

According to an aspect of the present disclosure, a method is provided by which circuitry in primary node 110 may determine the "time of flight" delay or the amount of time required for the primary node to send a request to a secondary node and for the primary node to receive a response from the secondary node. Based on such time of flight information, primary node 110 may then schedule or coordinate transmission on various time slots to avoid collisions, such as that shown in FIG. 19.

FIG. 20 shows a flow chart of a method for determining time of flight information for each second node 112. In step 2002, circuitry in primary node 110 initializes the time of flight of flight (TOF) offset for each leaf 112 to zero. In step 2004, a test message or TOF offset is sent to each leaf node 112 with an instruction or request for each such leaf node 12 to respond on a control channel, such as an in-band channel that is transmitted with data and is carried by one of the subcarriers. Circuitry in primary node 110 next measures a response time for each leaf node 112 (step 2006). Circuitry in primary node 110 next determines the difference in TOF times ("delta TOF") for each node and each delta TOF is adjusted so that the leaf node 112 having the longest TOF has a delta TOF of zero (step 2008). Next, circuitry in primary node 110 determines when the delta TOF response time of each leaf node 112 is within a given tolerance or margin (step 2010). If not, steps 2004, 2006, 2008, and 2010 are repeated and will continue to be repeated until the delta response time is within such margin. If the delta response time is within the margin, the above method starts again at step 2002 to reassess TOF information after a predetermined time period of X milliseconds.

Once the TOF and delta TOF information is obtained by the method shown in FIG. 20, primary node 110 schedules time slots to avoid collisions through a further method having an associated flow chart shown in FIG. 21. In a first step 2102 of the scheduling method, hub 110 evaluates or measures by way of the control channel noted above leaf node utilization of subcarriers and time slots. Based on such measured utilization, circuitry in hub 110 determines whether a leaf node is within the TOF tolerance or margin (step 2104). If yes, one or more time slots are allocated to that leaf node (step 2106), and, if not, the hub node provides instructions so that one or more subcarriers are allocated to such leaf node such that such leaf node may continuously transmit data on such allocated subcarrier(s) to hub node 110. The leaf nodes are then configured to transmit only during designated time slots or continuously over a one or more subcarriers in accordance with instructions received, for example, by way of the subcarriers noted above dedicated for sending control channel information (step 2110). In step 2112, the hub monitor leaf node utilization over a predetermined time period, such as a time period of Y milliseconds. The process next returns to step 2102.

Note that the above TOF-related calculations may performed outside of primary node 110 or by circuitry inside primary node 110, as noted above.

Figure 22:
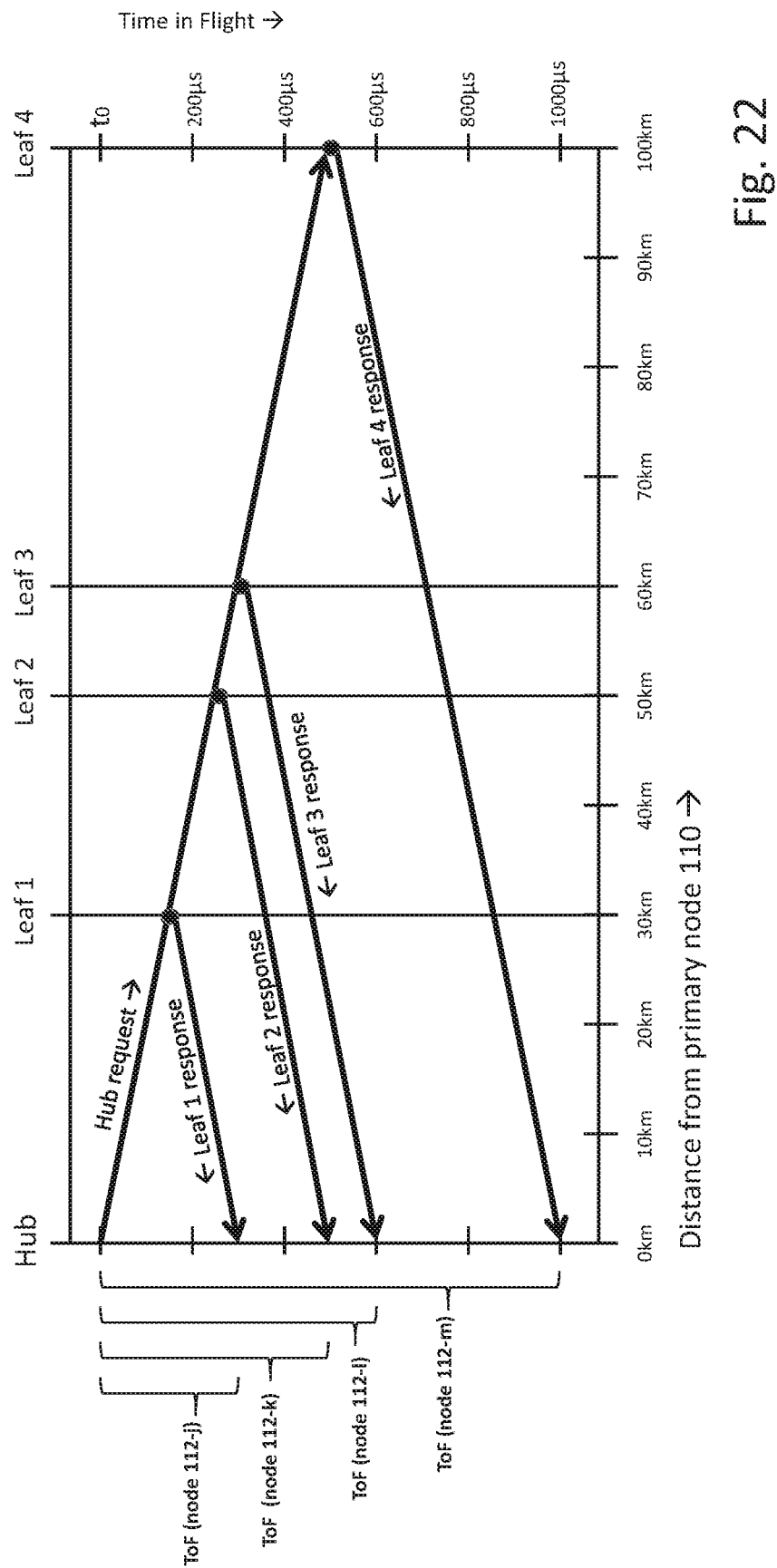
FIG. 22 is a plot showing examples of time hub request and leaf response times, as well as corresponding TOF times.

FIG. 22 is a plot showing examples of time hub request and leaf response times, as well as corresponding TOF times. As depicted in FIG. 22, the farther away a secondary node is from the primary node, the longer or the greater the TOF time. For example, secondary node 112-m is located 100 km away from primary node 110 and is thus the farthest secondary node away from primary node 110. Further, in this example, secondary node 112-l is 60 km away from primary node 110, and secondary node 112-k is 50 km away. In addition, node 112-j is located 30 km away from primary node 110 and is thus the closes secondary node to the primary node.

TOF values are determined by circuitry in primary node 110 that measures the time it takes for the primary node to receive a response from a secondary node following a TOF request response (see steps 2004 and 2006 above). As shown in FIGS. 22 and 23, the TOF associated with second node 112-j is 300 µs (or 1.5 time slots (TS), assuming each time slot is 200 µs); the TOF associated with node 112-k is 500 µs (or 2.5 TS); the TOF associated with node 112-l is 600 µs (3.0 TS); and the TOF associated with node 112-m is 1000 µs (or 5.0 TS). As noted above, after each TOF is determined, circuitry in primary node 110, for example, determines the TOF associated with each node, wherein the delta TOF is the difference between the longest TOF, here 1000 µs, and the TOF of each remaining secondary node 112 (i.e., longest TOF-TOF of each remaining secondary node). Accordingly, as further shown in table 2302, the delta TOF associated with secondary node 112-j is 700 µs (1000 µs–300 µs=700 µs or 3.5 TS); the delta TOF associated with secondary node 112-k is 500 µs (1000 µs–500 µs=500 µs or 2.5 TS); the delta TOF associated with secondary node 112-l is 400 µs (1000 µs–600 µs=400 µs or 2.0 TS); the delta TOF associated with secondary node 112-m is 0.0 µs (1000 µs–1000 µs=0.0 µs or 0 TS).

In scheduling the transmission from secondary node 112 to primary node 110, both TOF and delta TOF are taken into account in order to achieve desired arrival times at primary node 110 for each such transmission. An example of such scheduling will next be described with reference to FIG. 24.

Figure 24:
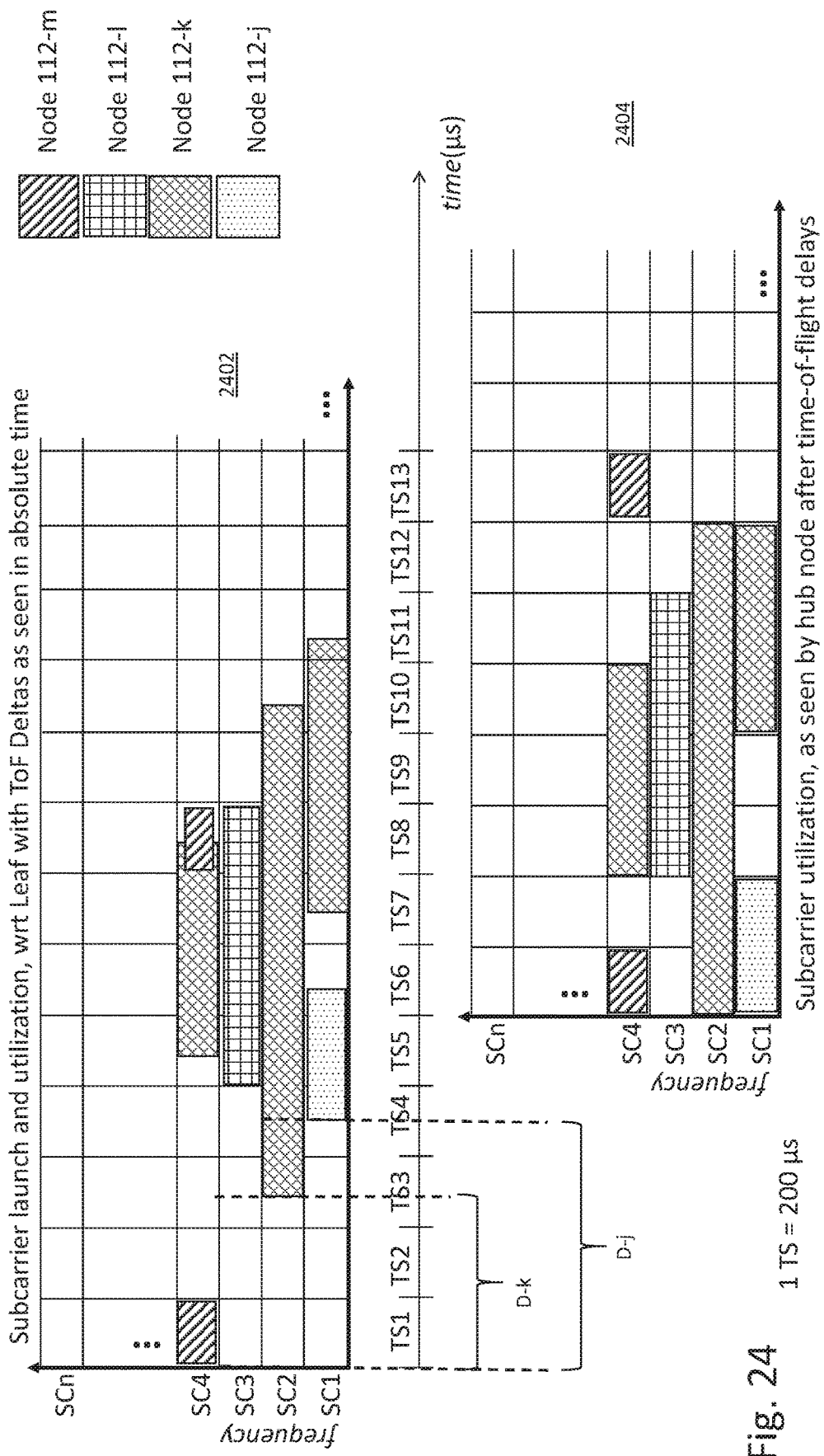
FIG. 24 shows timing charts that illustrate launch timing and leaf node utilization, as well as data carried by various subcarriers originating at secondary nodes and corresponding arrival times at the primary node.

FIG. 24 shows example timing charts 2402 and 2404 in which, for ease of explanation, transmission on only subcarriers SC1 to SC4 is shown. Chart 2402 shows launch timing and leaf node utilization in absolute time for the secondary nodes have the TOFs and delta TOFs noted in FIGS. 22 and 23. Chart 2404 shows data carried by various subcarriers originating at such secondary nodes and corresponding arrival times at the primary node without any collisions also in absolute time. In one example, as shown in FIG. 24, it is desirable that node 110 receive data on subcarriers SC1, SC2, and SC4 from secondary nodes 112-j, 112-k, and 112-m respectively, at the beginning of time slot TS6. As noted above, since secondary node 112-m is the farthest from primary node 110, secondary node 112-m has an associated delta TOF of zero (0). Data is thus scheduled to be transmitted, as shown in chart 2402, during time slot TS1, and, as shown in chart 2404, such data arrives five time slots later during time slot TS6 (see FIGS. 22 and 23). Node 112-k, on the other hand, has a shorter time of flight of 2.5 TS. In order to arrive at node 110 at approximately the same time as the data output from node 112-m, transmission from node 112-k is scheduled to be output or launched toward node 110 following the launch of the node 112-m data by an amount of time or delay D-k in chart 2402 approximately equal to delta TOF associated with node 112-k or 2.5 TS (see chart 2402). As a result, following such delay, the node 112-k data is further delayed by the TOF associated (2.5 TS) with node 112-k, such that the 112-k data arrives at approximately the same time as the 112-m data (see chart 2404).

Further, in order for data transmitted from node 112-j to arrive at node 110 at approximately the same time as data output from node 112-m, transmission from node 112-j is scheduled to be launched toward node 110 after the launch of the node 112-m data by an amount of delay D-j approximately equal to the delta TOF associated with node 112-j or 3.5 TS (see chart 2402). Accordingly, following D-j, the node 112-k data is further delayed by the TOF associated (1.5 TS) with node 112-j, such that the 112-j data arrives at approximately the same time as the 112-m data (see chart 2404).

Other example launch and arrival times and subcarrier utilization are further shown in FIG. 24.

In another example, empty time slots may be provided between transmission by one node on a given subcarrier and transmission by another node on that subcarrier in order to provide sufficient time between slots so as to reduce the risk of collisions or data transmission on a given subcarrier in which time slots overlap, for example, as shown in FIG. 19.

Figure 25:
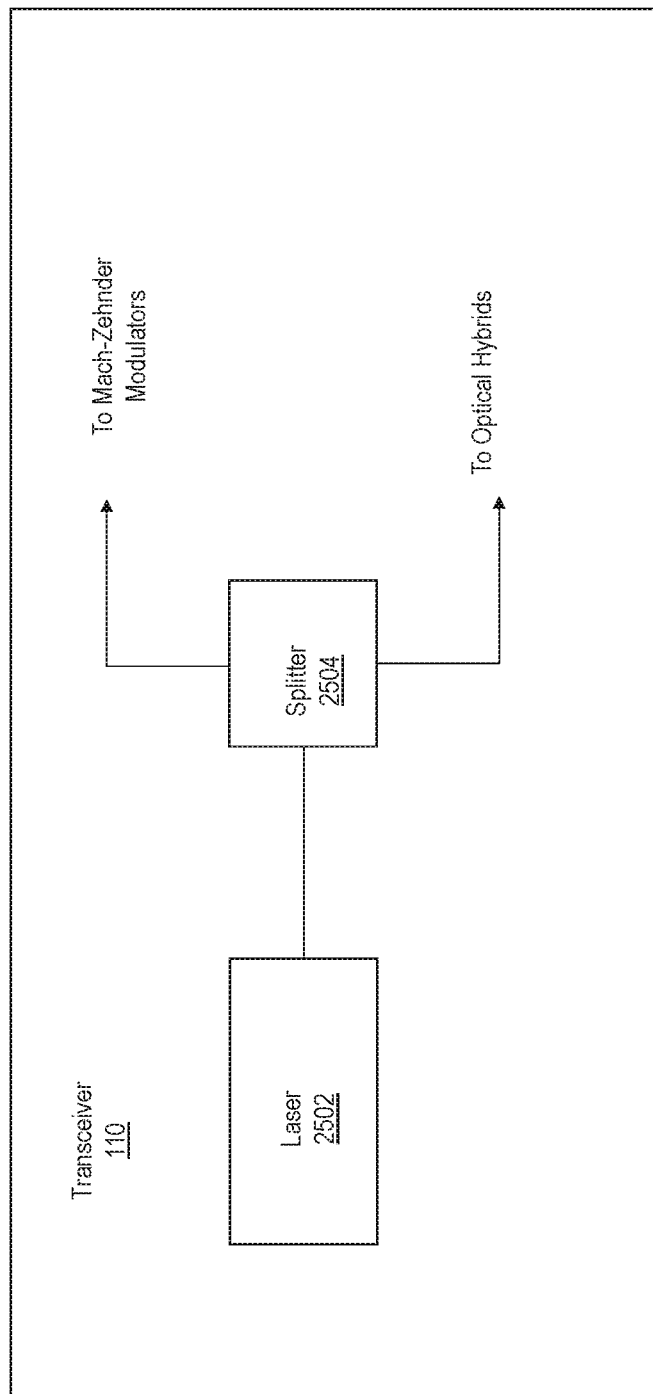
FIG. 25 is a diagram illustrating an example of the transceiver using a shared laser providing optical signals both for transmission and reception (as a local oscillator signal).

Various modifications and other embodiments will be apparent to those skilled in the art from consideration of the present specification, and the detailed implementations described above are provided as examples. For example, the digital signal process disclosed above may be implemented as a programmable gate array circuit (PGA), or a field programmable gate array circuit (FPGA). In addition, although separate lasers 908 and 1110 are provided in the transmitter and receiver, respectively, as noted above, a transceiver consistent with the present disclosure may include a common laser that is "shared" between the transmitter and receiver. For example, FIG. 25 is a diagram illustrating an example of the transceiver 110 using a shared laser 2502 providing optical signals both for transmission and reception (as a local oscillator signal) in accordance with one or more implementations of the present disclosure. As shown, the laser 2502 generates an optical signal and provides the optical signal to the splitter 2504. The splitter 2504 splits the optical signal into two portions. One portion is provided to the optical hybrids or mixers 1120-1 and 1120-2, while the other portion is provided to modulators 910-1 to 910-4.

Accordingly, other implementations are within the scope of the claims.

The invention claimed is:

1. A transmitter, comprising:
   a laser operable to output an optical signal;
   a digital signal processor circuit operable to receive first data and receive second data after receiving the first data, the digital signal processor supplying a first plurality of electrical signals based on the first data and supplying a second plurality of electrical signals based on the second data;
   a plurality of digital-to-analog conversion circuits operable to provide a first plurality of analog signals based on the first plurality of electrical signals and a second plurality of analog signals based on the second plurality of electrical signals; and
   a modulator operable to modulate the optical signal to provide a first plurality of optical subcarriers based on the first plurality of electrical signals and a second plurality of optical subcarriers based on the second plurality of electrical signals, each of the first plurality of subcarriers and each of the second plurality of optical subcarriers including an in-phase component and a quadrature component, such that a number of the first plurality of optical subcarriers is different than a number of the second plurality of optical subcarriers; and
   a plurality of switches coupled to the digital signal processor, each of the plurality of switches selectively supplying an input to the digital signal processor,
   wherein one of the plurality of switches is configured to supply control data to the digital signal processor, such that one of the plurality of optical subcarriers carries information indicative of the control data.

2. The transmitter in accordance with claim 1, wherein each of the first plurality of optical subcarriers and each of the second plurality of optical subcarriers is a Nyquist subcarrier.

3. The transmitter in accordance with claim 1, wherein the digital signal processor includes a programmable gate array (PGA) is a digital signal processor.

4. The transmitter in accordance with claim 1, wherein the digital signal processor includes a field programmable gate array (FPGA).

5. A receiver, comprising:
   an optical hybrid circuit that receives local oscillator light, a first polarization component of a plurality of optical subcarriers and a second polarization component of the plurality of optical subcarriers, wherein each of the plurality of optical subcarriers is generated by modulation of an optical signal output from a laser, the optical hybrid circuit supplying a plurality of mixing products;
   a photodiode circuit that provide first electrical signals based on the plurality of mixing products;
   a digital signal processor that outputs data associated with the plurality optical subcarriers based on the first electrical signals, the processor circuit having a plurality of outputs; and a plurality of switch circuits coupled to the plurality of outputs, the plurality of switch circuits selectively supplying portions of the data, wherein one of the plurality of switch circuits supplies control data indicative of information carried by one of the plurality of subcarriers.

6. The receiver in accordance with claim 5, wherein said each of the plurality of subcarriers is a Nyquist subcarrier.

7. The receiver in accordance with claim 5, wherein the digital signal processor includes a programmable gate array (PGA).

8. The receiver in accordance with claim 5, wherein the digital signal processor includes a field programmable gate array (FPGA).

9. A method, comprising:

generating an optical signal;

receiving first data with a digital signal processor and receiving second data with the digital signal processor after receiving the first data;

supplying, with the digital signal processor, a first plurality of digital signals based on the first data and supplying, with the digital signal processor, a second plurality of digital signals based on the second data;

supplying a first plurality of analog signals based on the first plurality of electrical signals and supplying a second plurality of analog signals based on the second plurality of electrical signals;

modulating the optical signal to provide a first plurality of optical subcarriers based on the first plurality of electrical signals and a second plurality of optical subcarriers based on the second plurality of electrical signals, each of the first plurality of subcarriers and each of the second plurality of optical subcarriers including an in-phase component and a quadrature component, such that a number of the first plurality of optical subcarriers is different than a number of the second plurality of optical subcarriers; and supplying control data to the digital signal processor, such that one of the first plurality of optical subcarriers carries information indicative of the control data.

10. The method in accordance with claim 9, wherein each of the first plurality of optical subcarriers and each of the second plurality of optical subcarriers is a Nyquist subcarrier.

11. The method in accordance with claim 9, further including selectively supplying an input to the digital signal processor.

12. The method in accordance with claim 9, wherein the digital signal processor includes a programmable gate array (PGA) is a digital signal processor.

13. The method in accordance with claim 9, wherein the digital signal processor includes a field programmable gate array (FPGA).

* * * * *